United States Patent [19]
Blonder et al.

[11] Patent Number: 5,760,771
[45] Date of Patent: Jun. 2, 1998

[54] SYSTEM AND METHOD FOR PROVIDING STRUCTURED TOURS OF HYPERTEXT FILES

[76] Inventors: Greg E. Blonder, 112 Mountain Ave., Summit, N.J. 07901; Allen E. Milewski, 96 South St., Red Bank, N.J. 07701

[21] Appl. No.: 672,222

[22] Filed: Jul. 17, 1996

[51] Int. Cl.⁶ .................................................. G06F 3/00
[52] U.S. Cl. .................. 345/336; 345/329; 345/356; 345/302; 434/118; 705/26
[58] Field of Search ........................ 395/326–358, 395/205, 226, 605, 762; 463/31; 434/118; 345/326–358, 302; 707/5, 501; 705/26, 5

[56] References Cited

U.S. PATENT DOCUMENTS

| | | | |
|---|---|---|---|
| 5,310,349 | 5/1994 | Daniels et al. | 395/336 |
| 5,353,219 | 10/1994 | Mueller et al. | 395/226 |
| 5,388,993 | 2/1995 | McKiel et al. | 395/336 |
| 5,408,655 | 4/1995 | Oren et al. | 395/205 |
| 5,422,809 | 6/1995 | Griffin et al. | 395/205 |
| 5,442,759 | 8/1995 | Chiang et al. | 395/336 |
| 5,528,735 | 6/1996 | Strasnick et al. | 395/357 |
| 5,539,869 | 7/1996 | Spoto et al. | 395/762 |
| 5,607,356 | 3/1997 | Schwartz | 463/31 |

OTHER PUBLICATIONS

"Alaskan Adventure", PolarNet Web Site Original Creation: Feb. 1995, by Lori A Martin, Internet page—HTTP:/WWW.Imagi.Net/Links/Alaskan_Sites.HTML.

"PolarNets'WWW Tour", Internet page—HTTP:/WWW.Imagi.Net/Tourguid.HTML (This copy printed May 8, 1996).

"World Tour" Internet page—HTTP:WWW.TD.AnIgov/WorldTour.HTML (This copy printed May 8, 1996).

"Virtual Home Tours—Current Listing"–Internet page HTTP:WWW.HomeTours.COM/Tour.HTML (This copy printed May 8, 1996).

"Internet Quick Tour" Internet page HTTP:/WWW.NICOH.COM/Internet–Tour.HTML (This copy printed May 8, 1996).

"ICHAT Plug–In By ICHAT" Internet description page. (This copy printed approx. Jul. 1996).

*Primary Examiner*—John E. Breene
*Attorney, Agent, or Firm*—Barry H. Freedman

[57] ABSTRACT

A system and method for providing structured tours of hypertext files. A server controls the presentation of hypertext files to a user. Accompanying information to the hypertext files in the form of an automated tour guide is presented and synchronized with the hypertext files by the tour server. A user may depart from the structured tour to explore linked files for a predetermined period of time, and may effect the content and order of the tour by indicating preferences at predetermined points along the tour. More than one user may take a tour, and the users on a tour may communicate with each other. Items may be purchased on a tour, and the user may send postcards based upon visited hypertext files to other users.

39 Claims, 23 Drawing Sheets

FIG. 9

Campus and Community Life

[Announcements][Search Yale][Phone Book][YaleInfo][Front Door]  More About Yale
Next University
Explore

- [ ] Administrative Services
    Information from the office of Environmental Health & Safety, Human Resources & Yale University Press, among others.
- [ ] Athletics
    Schedules & varsity team news, along with athletic facility information
- [ ] Campus Publications
    Yale Daily News, Yale Bulletins & Calendar, and the Yale Herald, & others
- [ ] Events listings from the Yale Bulletin & calendar
    Weekly listing of seminars, cultural events & other activities on campus
- [ ] New Haven On Line
    Regional & historical info on the city & the surrounding area
- [ ] Office of Public Affairs
    University press releases & issues of the Yale Bulletin & Calendar
- [ ] Peabody Museum of Natural History
    Catalogue data from the curatorial collections of the museum
- [ ] Personal Home Pages
    Community member's personal WWW pages
- [ ] Religious Ministries Schedules
    Information from Yale's Religious Ministries
- [ ] Residential College Gallery
    Home pages of Yale's (online) residential colleges
- [ ] Student Organizations
    Student groups such as WYBC, Mixed Company & Yale Political Union
- [ ] Yale Directory
    Search the Yale database by name, email, department, or other criteria
- [ ] Yale School of Music Calendar
    Events listing from the school of Music
- [ ] Yale University Art Gallery
    Highlights from the collection, calendar of events, and general info
- [ ] Yale University Dining
    Daily menus & other Dining related info
- [ ] Images of Yale Campus
- [ ] An Introductory video about the University Quicktime or MPEG
- [ ] Maps of the Yale campus
- [ ] A virtual tour of the New Haven area
- [ ] Weather for Yale

SYSTEM AND METHOD FOR PROVIDING STRUCTURED TOURS OF HYPERTEXT FILES

FIELD OF THE INVENTION

This invention relates to providing a structured tour of hypertext files, and particularly to a system and method for providing a cogent, coherent, and social experience of hypertext files related to each other by a common theme.

BACKGROUND OF THE INVENTION

A hypertext file is a file stored on a computer that, when displayed, contains areas known as links which when selected by a user cause another page (the linked 10 page) to be displayed, or else cause another part of the same page to be displayed. A typical application in which hypertext files are used is on a website. A website is a logical grouping of hypertext files. These files are written in a programming language such as, Hypertext Markup Language (HTML). Website files may reside on a single stand-alone computer, on computers linked via an intra network (a Local Area or Wide Area Network), or on a computer with an Internet address, known as a host. Websites linked together over the Internet are known collectively as the World Wide Web (WWW).

A hypertext file is loaded and displayed on a user's computer by software called a browser. A loaded and displayed hypertext file is called a page. Almost every hypertext file contains at least one link that is usually presented on a page by textual or graphic information.

A link describes the location of a hypertext file other than the one on which the link is displayed, called the linked file, or else it describes another location within the same page on which it is displayed, called the linked location. When a link is selected by a user, the browser either loads and displays the linked file (also known as the linked page), or else displays the linked location of the same page (i.e., it jumps to the linked location in the same page). The linked page may reside on the same computer as the user, another computer intranetworked to the user's computer, or a host internetworked to the user's computer.

A newly displayed linked page also contains links to yet other hypertext files. By continuing to select links within pages, the user moves from page to page and website to website in a practice known in the art as surfing. Surfing is accelerated when the user is presented with too much information on a site, or when the length of time demanded by a site exceeds the user's patience or attention span.

Surfing generally results in a serendipitous journey across pages that often lacks any common theme or cogency. Surfing often leaves the user with little to show for his time and effort looking at pages. Even returning to a previously viewed page can be difficult. To redress this problem, known browsers incorporate a feature called a Go List wherein the user is presented with a list of his recently loaded pages upon request. When the user selects a page on the list, the browser reloads and redisplays the page. This list is erased each time the user exits the browser.

Known browsers also provide a bookmark feature that stores the location of a visited page when commanded by a user. The list is maintained from session to session. The user can return to a page on this list by selecting it.

Neither the Go List nor the bookmark feature allow the user to easily put together a coherent program of pages to visit. Rather, the user surfs from page to page, deciding on which links to select mostly by guesswork. Some websites provide audio programs using streamed, real-time audio data and software. The user may select an audio piece, such as a news story, whereupon it will be loaded and played to the user. Some of these audio pieces are arranged by a common theme on a page. For example, a page may contain a series of news stories that have been formerly been presented on public radio. A user may select a series of such audio stories to assemble a coherent program of information centered around a common theme.

However, these audio sites suffer from the same drawbacks as conventional text and graphics pages. The audio sites contain links to other sites which tempt the user leave the site to surf with no provision to bring him back to the audio site when he is done exploring. Further, every audio file has to be activated by the user one at a time. Little accompanying information is provided to indicate the content of these audio files, leaving the user to guess if the audio file is genuinely of interest. The audio files are only loosely related by theme, and generally fail to tell a story or present a program as a whole. Further, little or no information is provided linking one audio file with another. They exist essentially independently from each other.

What is needed is a way to have a cogent, structured experience on one or more websites wherein the user is presented with useful information centered around a common theme. Unlike surfing, such an experience would constitute an organized tour of predetermined pages, informing and entertaining the user about a topic about which the user has expressed an interest.

The tour may be almost entirely passive, only requiring the user to select a theme and begin the experience. Alternatively, the tour may involve varying amounts of interactivity between the user and the provider of the tour. This interactivity may vary the order or content of the tour, or enable the user to purchase items displayed on the tour. The experience would be a social one, providing the user with the opportunity to communicate interactively with others who may be experiencing the tour at the same time.

SUMMARY OF THE INVENTION

The present invention provides a system and method for providing a structured, organized tour of Hypertext files for at least one user at a time. The tour is selected by a user from a tour service page, and is comprised of a set of predetermined pages and an automated tour guide. A predetermined page may reside on the same server as the tour service page, or on another computer to which the user's computer has access through a network.

Not all of the predetermined pages need to be shown during the course of a particular version of the tour. This is because the user is afforded the opportunity to interact with the tour service, providing information on his particular interests and desires in a way that alters the course of a tour. For example, a tour of pages concerning France may contain predetermined pages concerning both French cities and the French countryside. Early in the tour, the user is solicited for his preference for a cities-only tour, a countryside-only tour, or both. If the user indicates he wants a city-only tour, only the predetermined city pages will be displayed to the user.

The tour is selected from a tour service page, which lists the available tours as links. The links may be represented by one or more of graphic, audio, text, video and animation components. A tour may be experienced by a user alone, or along with other users. Users on a multi-user tour may communicate with each other by various means during the tour.

3

A user may initiate a group tour, in which a group of users begin and participate in a tour together. This is especially advantageous for members of a club, a family, or group of friends who wish to experience a tour together. The initiating user is designated the tour proctor, and is able to specify the time the tour starts, when other users may enroll in the tour, and may exclude certain users from participating.

The automated tour guide may be represented by an animated figure who appears on the user's screen periodically to provide or solicit information. The guide makes introductory remarks about the structure and content of the tour, narrates the display of an itinerary page that lists some or all of the predetermined pages to be visited on the tour, and provides transitionary information from page to page. The guide may also appear as a video figure, provide textual information, and play audio pieces such as narration and music.

The guide may also solicit information from the user. The user may have the opportunity to make purchases during the tour, whereupon the guide may ask the user to provide credit card and shipping information. The guide may also ask the user to state a preference for more specific content or for information on a new topic. The user is afforded the opportunity to provide such information by means such as selecting items displayed on a page, using a keyboard, speaking into a microphone connected to a computer and the like.

If a page scheduled to be shown is unavailable, the tour can skip that page and continue on seamlessly. A page may be unavailable because the server from which it is loaded is broken or disconnected from the network. The tour may display the page later in the tour if it becomes available. Likewise if a delay in displaying a page is anticipated, the tour will display predetermined padding information, the guide will provide padding, or both. Padding is predetermined content, usually of a general nature, that may be inserted seamlessly anywhere in a tour. For example, padding in an education tour may consist of a discussion of general trends in the cost and financing of tuition. This discussion may consist of graphs and charts accompanied by narration. A page may be delayed because it must be loaded from a server that is overburdened and slow.

A user is afforded the opportunity to leave the tour for independent exploration for predetermined amounts of time. During this free time, the user may explore the page or surf by selecting links. At the end of the predetermined time, the guide announces the tour is resuming and displays the next scheduled page in the tour to the user. This advantageously maintains the cogency of the user's experience while affording him the flexibility and freedom to cater to his own interests in a way that the structured tour may not otherwise be able to accommodate. A user is also afforded the opportunity to leave the tour permanently by selecting a different "leave tour" option.

During a tour, a user may elect to take a snapshot of a presently displayed page for a souvenir. The tour saves a picture of the displayed page along with its URL in a file which it presents to the user at the end of the tour. The user is also given the opportunity to send a "postcard" of any given snapshot to another user. This may be implemented using an e-mail facility, or other suitable means. The user also receives a list of all pages displayed during the tour. This includes all predetermined pages displayed as well as those pages displayed during the user's independent exploration.

At the end of the tour, the user is returned to his browser. The browser may display the tour service page, giving the user the option to select and participate in another tour.

4

BRIEF DESCRIPTION OF THE DRAWINGS

FIG. 9 shows an embodiment of yet another education tour page.

DETAILED DESCRIPTION

Figure 1:
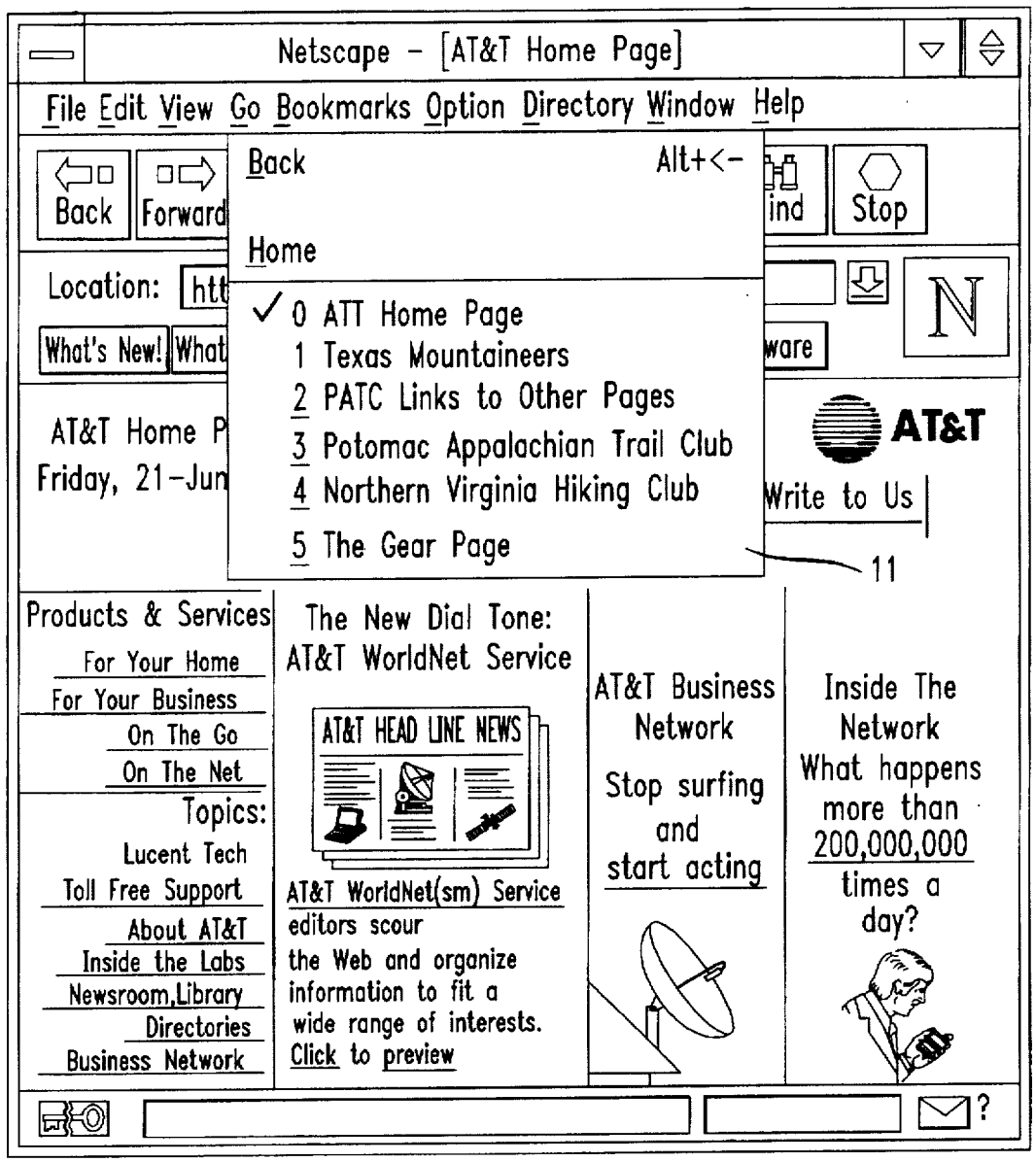
FIG. 1 shows a known browser feature, a Go list, that allows a user to return to pages recently displayed in the same session.

FIG. 1 shows a feature of a known browser that presents the user with a list of page titles he has already visited during the present session in Go list 11. If the user wishes to return to a page displayed earlier, he may select its title from the Go list 11 and the browser will display the previously viewed page. By viewing a series of pages according to a theme, the user may construct a viewing program, any page to which he may return later in the same session by selecting it from the Go list 11.

However, this self-constructed program is entirely driven by the user, and is subject to the same problems presented by surfing. The content of many pages is unknown until visited, whereupon it is automatically added to the Go list 11. Further, the size of such a program would be severely limited to a few pages because only a few visited page titles can be kept on the Go list 11 at one time.

Figure 2:
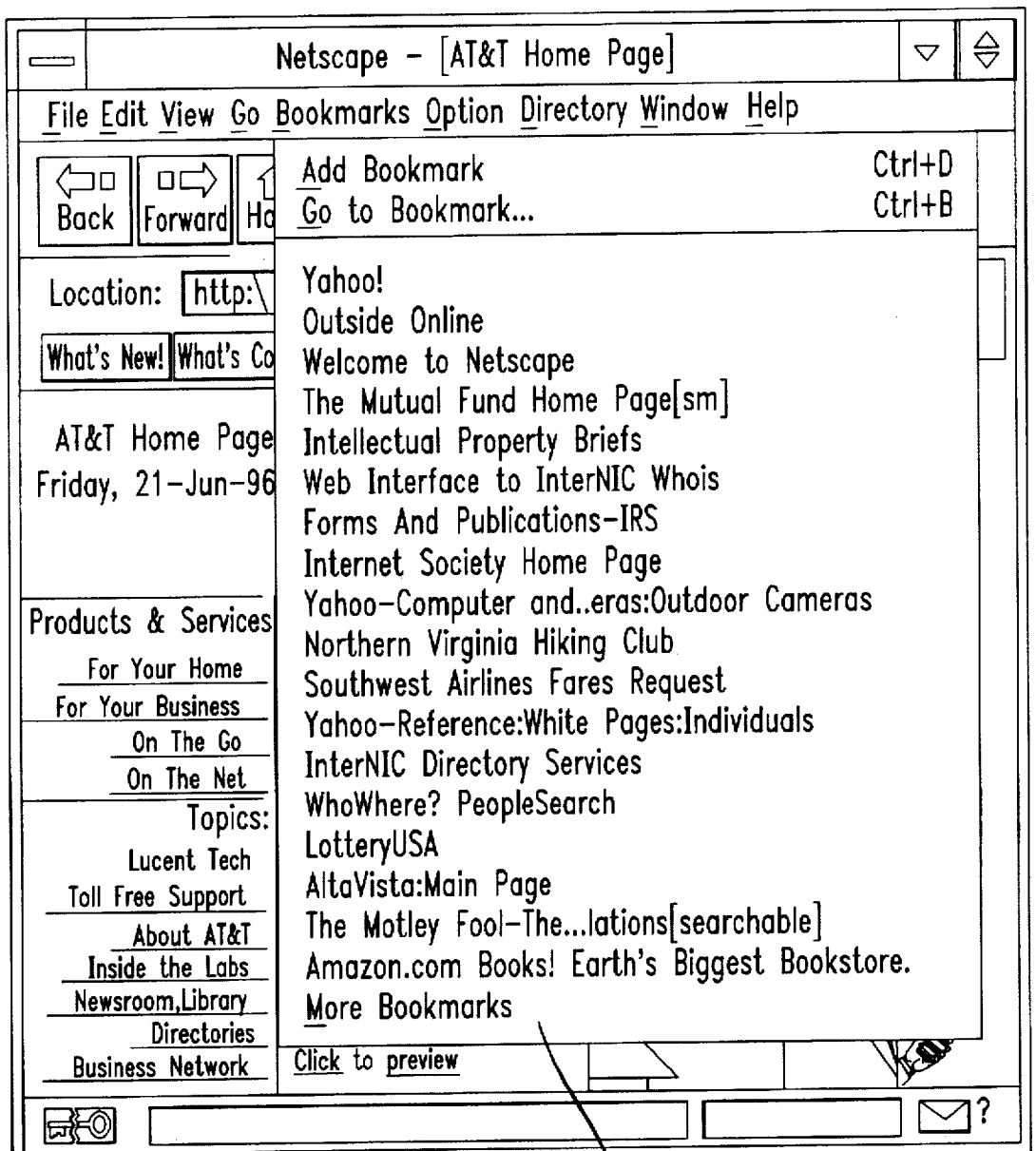
FIG. 2 shows a known browser feature, a bookmark list, that allows a user to return to pages saved over one or more sessions.

FIG. 2 shows a feature of a known browser that presents a list of bookmarks 21 saved by the user from the present or earlier browser sessions. A user can construct a viewing program by storing bookmarks for pages according to a theme, and may revisit any page in the program by selecting its title from the list of bookmarks 21. This is also entirely driven by the user, provides no information relating the successive pages, and is subject to the same problems of surfing.

Figure 3:
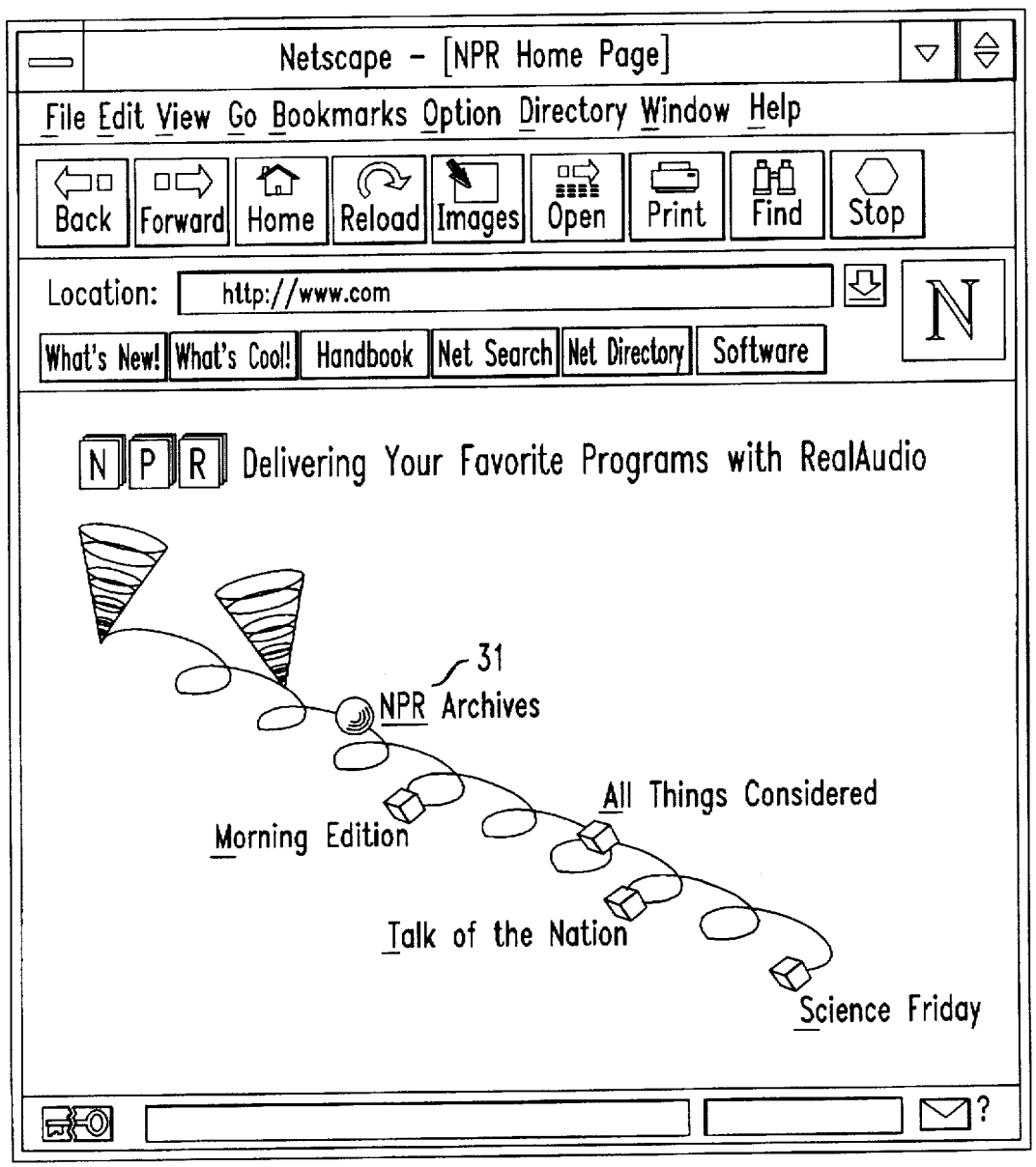
FIG. 3 shows a known audio site that provides audio files to which a user may listen.

FIG. 3 shows a page presenting links by which the user may select audio files that are played in real time through the user's browser. Upon selecting NPR Archives 31, the user is presented with a series of story titles accompanied by short descriptions. The story titles are links which, when selected, will cause the user's browser to play the audio of a story formerly presented on National Public Radio. When the story is completed, no further audio is played until the user selects another link. In this way, a user may engage in audio surfing within this website, or to other websites. No information is provided that relates one story to another. Nor is there an introduction, conclusion, or summary of stories played at the end of the session.

The present invention provides a system and method for touring a set of pages according to a theme. This is implemented with software that functions in conjunction with a known browser, which in turn operates on a computer which is stand-alone, intranetworked, or internetworked with other computers or hosts.

According to the present invention, the set of pages included in a tour are predetermined by the tour service provider. The tour is presided over by an automated tour guide that provides information about the tour, generally in an entertaining fashion.

The information provided by the tour guide includes introductory remarks about the overall structure, theme, and content of the tour. It also includes information that augments and complements the information provided in the content of pages displayed on the tour. The guide smoothes the transition between pages displayed on the tour, provides instructions to the user for using the tour service, and queries the user regarding the user's preferences, personal data, and the like. At the end of the tour, the guide provides closing remarks, narrates a summary of the tour, directs the user to other resources, and the user is returned to the browser. The browser may display the tour service page so the user can select another tour.

Figure 10:
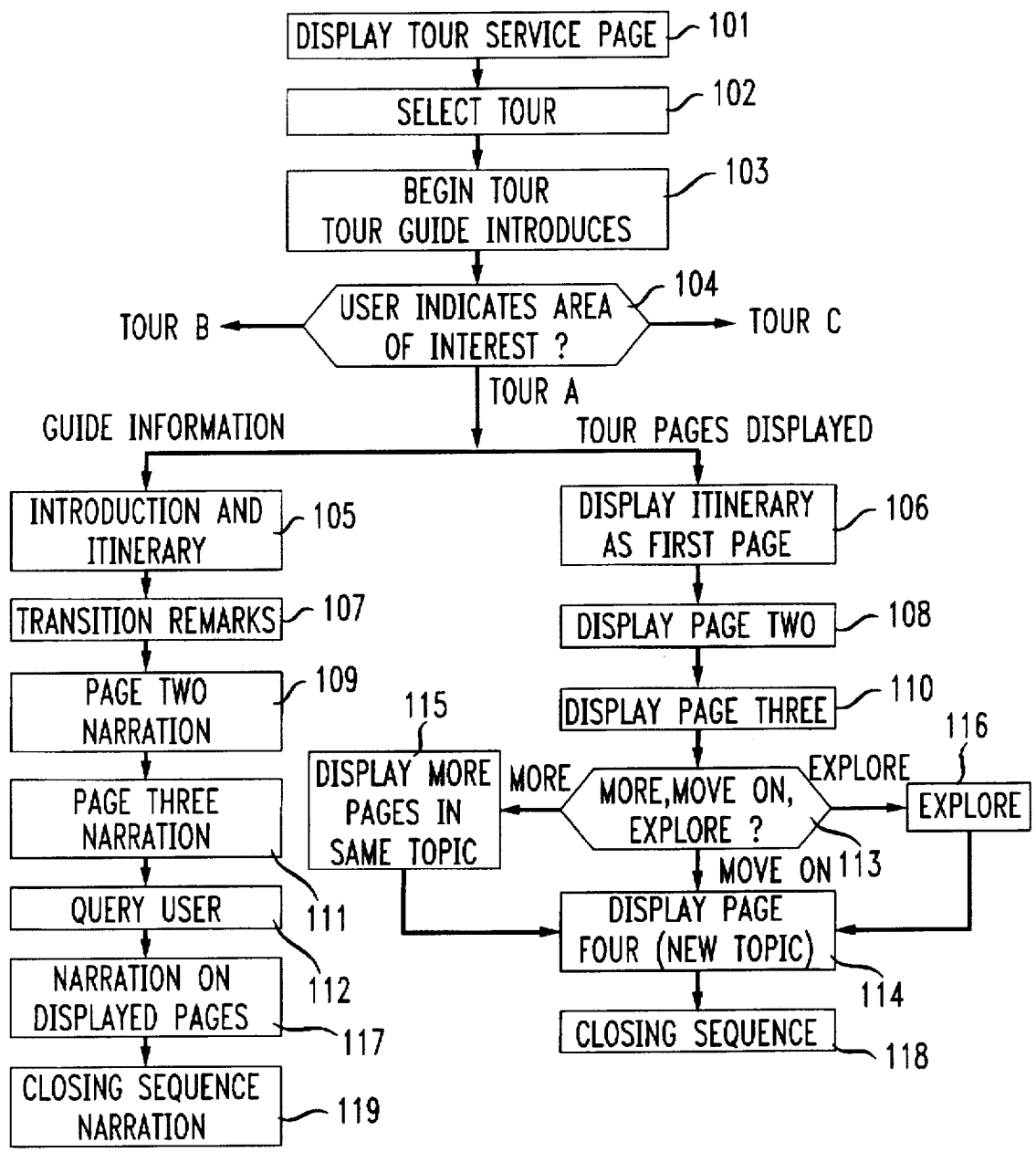
FIG. 10 shows a flow chart of an embodiment of a tour according to the present invention.

A user accesses a tour by using his browser to display a tour service page. FIG. 10, which shows the steps of carrying out an embodiment of a tour, shows this initial step as box 101.

Figure 4:
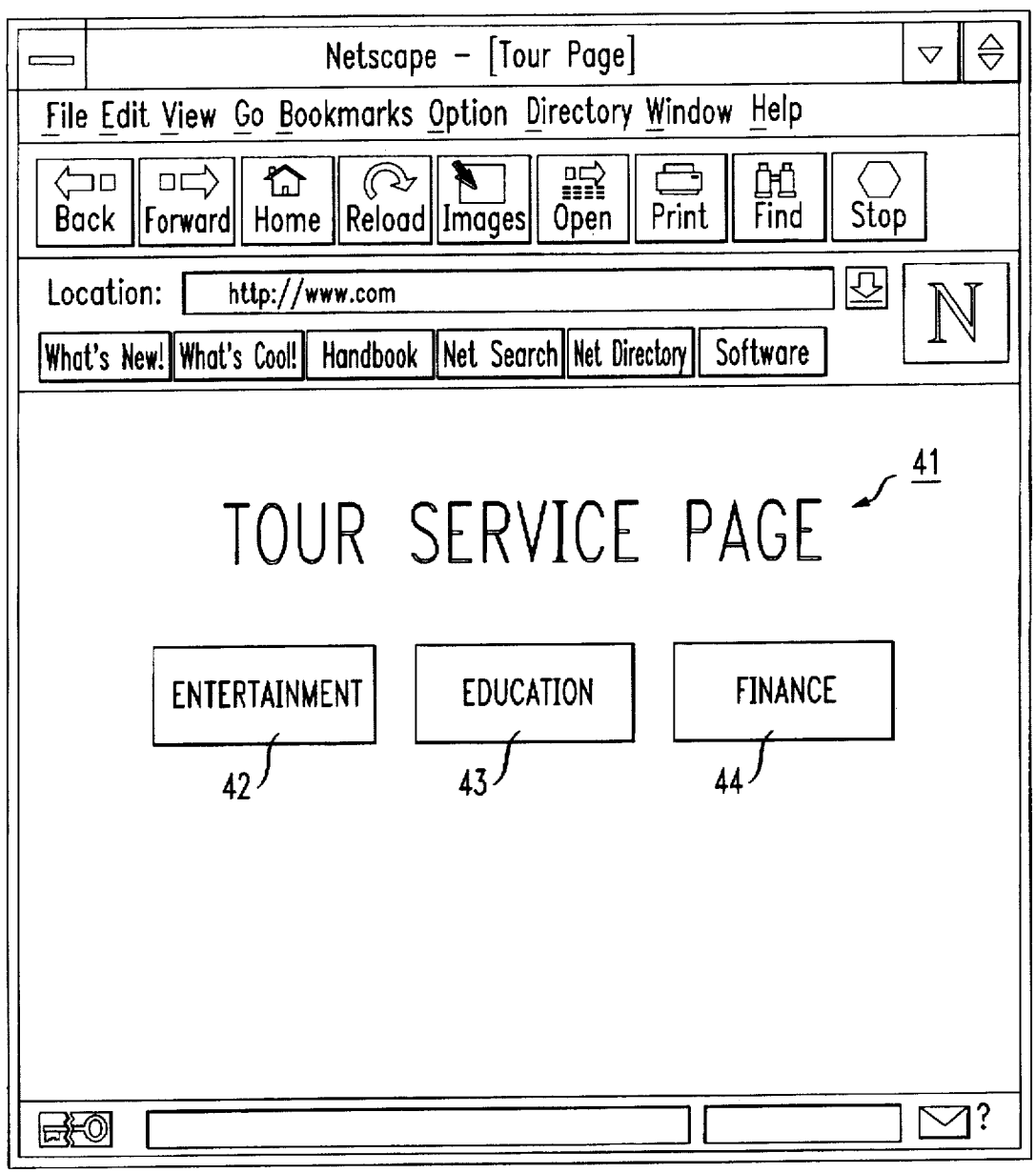
FIG. 4 shows an embodiment of a tour service page in accordance with the present invention.

FIG. 4 shows an embodiment of a tour service page 41 that has graphics selectable by a user indicating the categories of Entertainment 42, Education 43, and Finance 44. Upon selecting the Education link 43, the user is presented with a new page 51 shown in FIG. 5.

Figure 5:
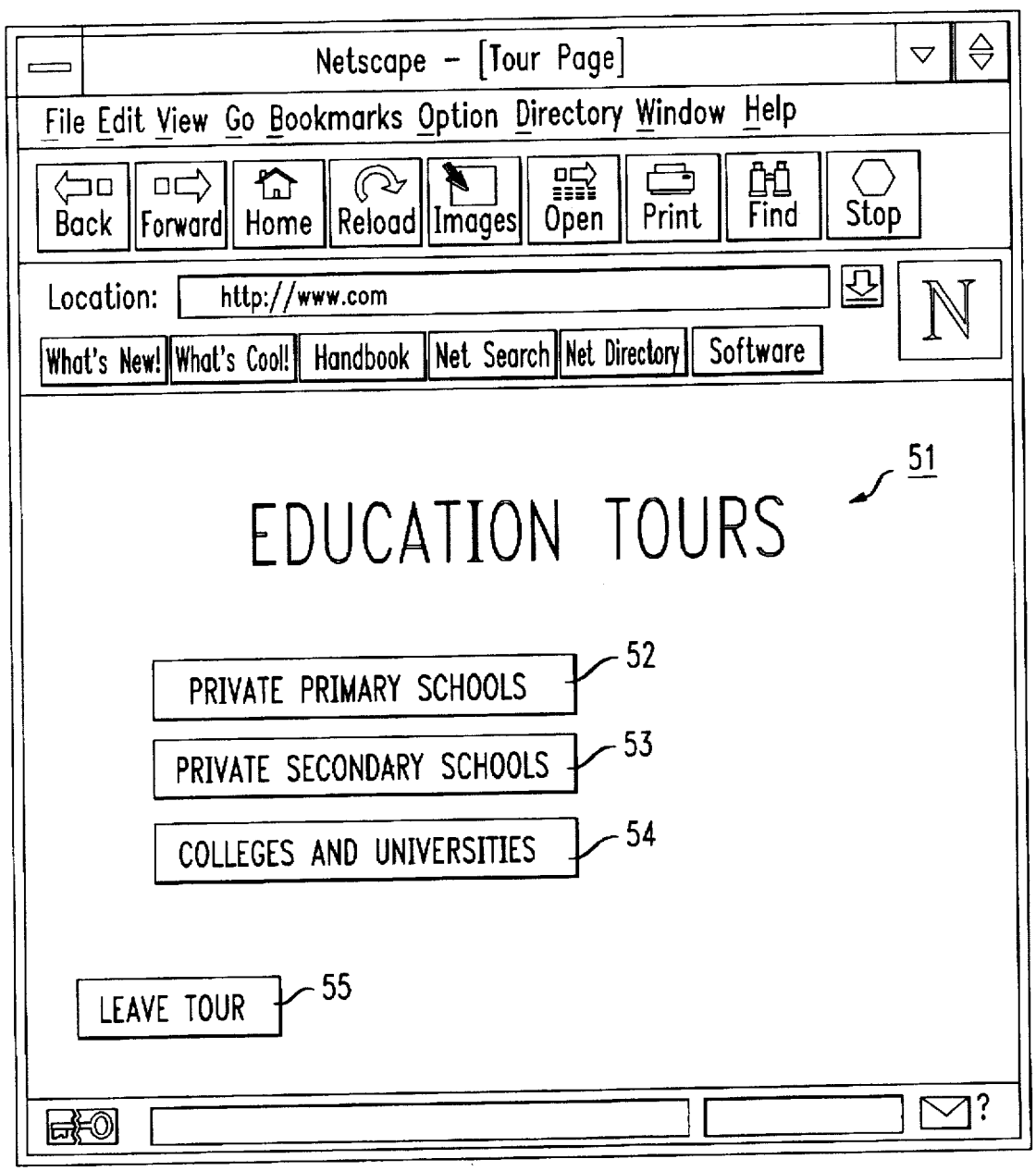
FIG. 5 shows another embodiment of another tour service page.

The page 51 shown in FIG. 5 shows a selection of tours. The tours are of Private Primary Schools 52, Private Secondary Schools 53, and Colleges and Universities 54. This page also contains a Leave Tour graphic 55 which, when selected by the user, returns the user to the tour service page shown in FIG. 4.

A user initiates a tour by selecting one of the tour options. This step is shown as box 102 in FIG. 10.

Upon selecting Colleges and Universities 54, a tour is launched in conjunction with the user's browser. The software required to run the tour may be a part of the browser itself or may be downloaded from a tour service provider host by the user on demand.

After a tour is selected, an introductory screen is displayed to the user, and introductory information is provided through the automated tour guide. This is shown as step 103 in FIG. 10.

Figure 6:
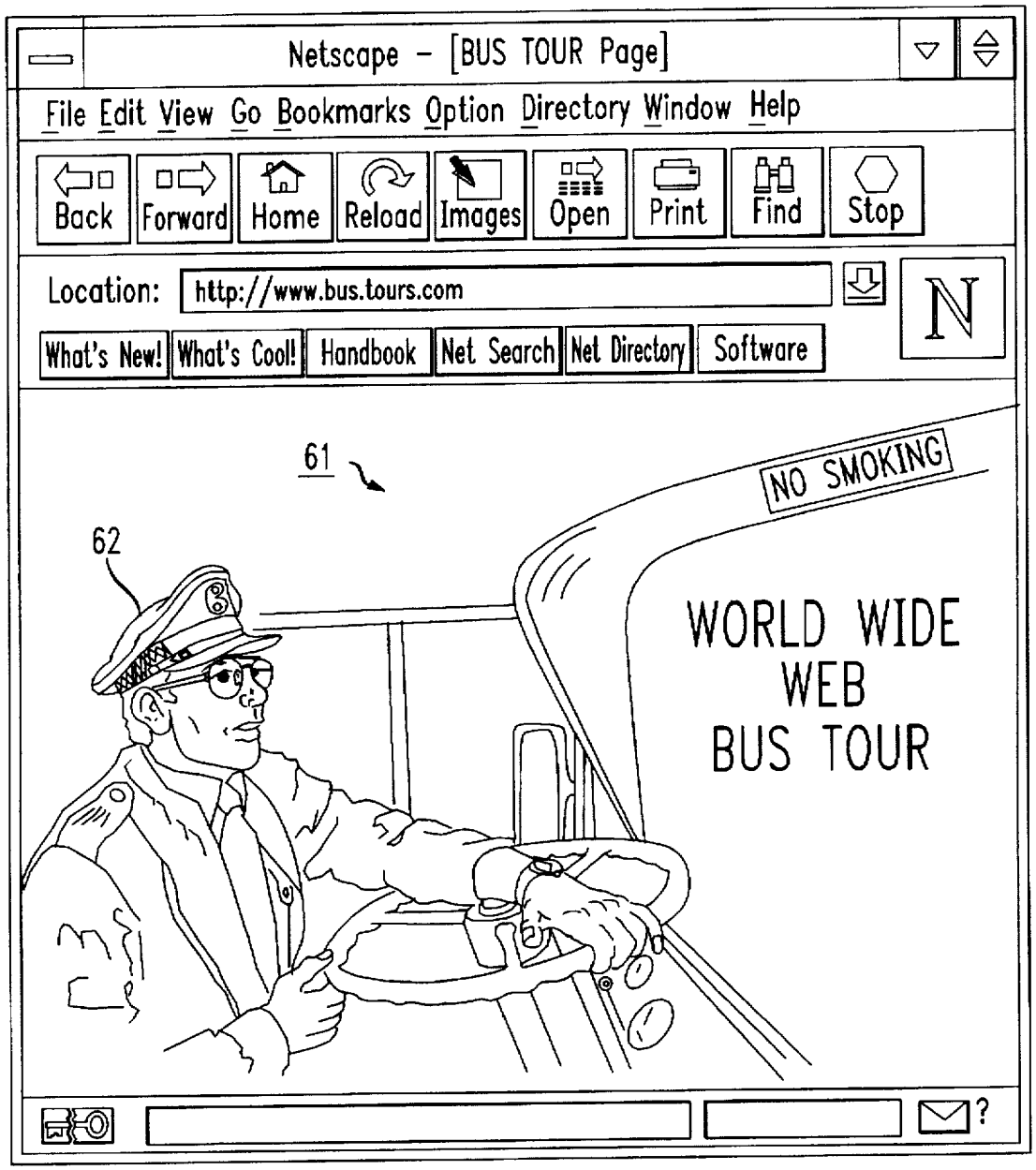
FIG. 6 shows an embodiment of a tour page showing an automated tour guide.

FIG. 6 shows a generic introductory screen 61 with an animated representation of an automated tour guide 62. In FIG. 6, the tour guide 62 appears as a bus driver, and the motif of a bus tour is presented in the rest of the screen 61. The tour guide 62 presents audio introductory remarks to the user that describe the tour and states that the tour will visit websites developed and operated by colleges and universities. As he is making these remarks, his mouth and facial expressions are animated.

After the introductory screen and remarks, a page is displayed to the user that affords him the opportunity to interact with the tour service and choose the course of the tour. This is shown as box 104 in FIG. 10.

Figure 7:
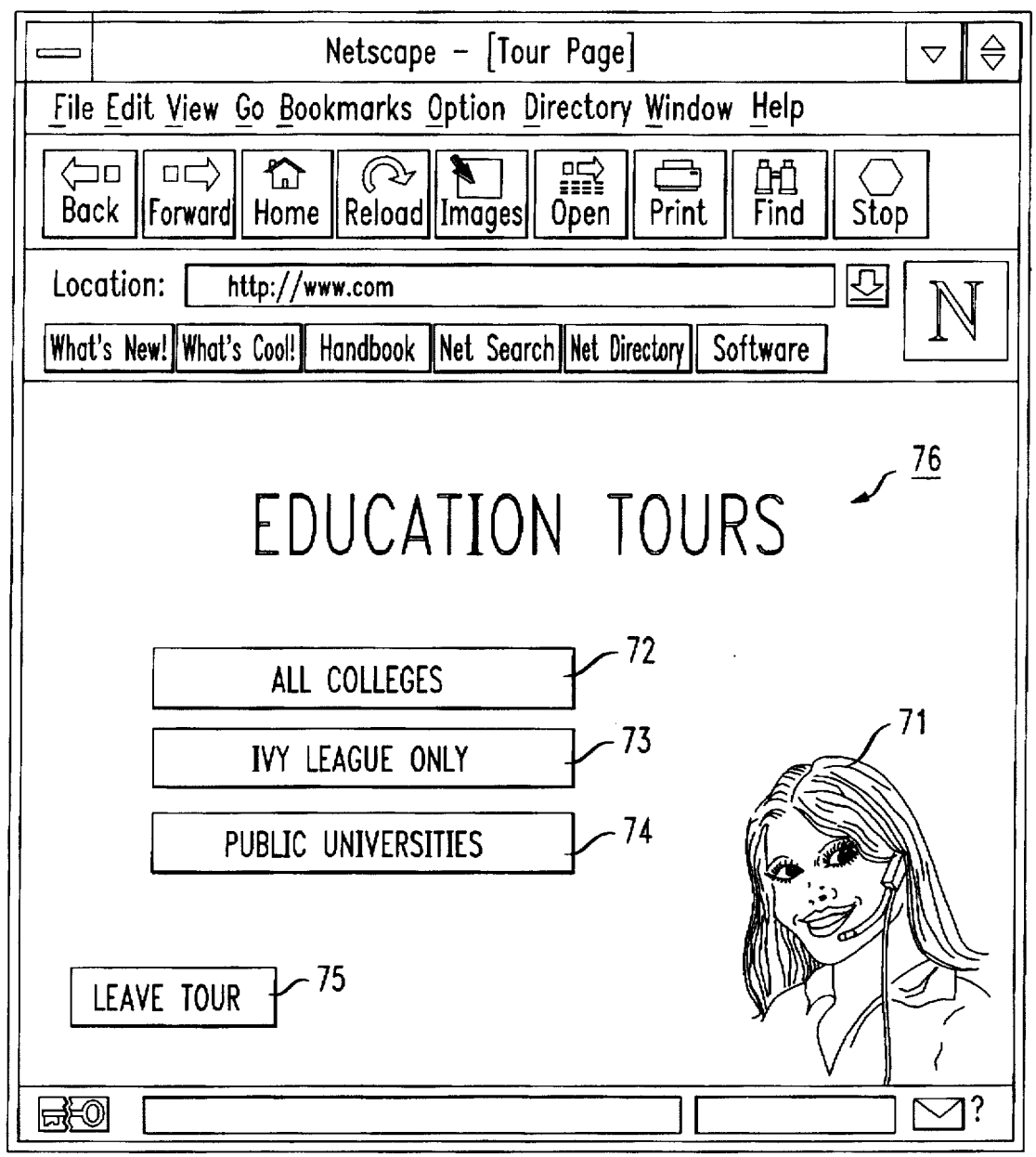
FIG. 7 shows an embodiment of an education tour page.

FIG. 7 shows an embodiment of such a page 76. The guide 71 queries the user for additional information regarding the user's interests to further tailor the content or order of the tour. This query is supported by information about the contents of each of three options available to the user: colleges generally, ivy league universities only, or public universities only. Each of these options is supported by a corresponding graphic representing All Colleges 72, Ivy League Universities Only 73 and Public Universities 74. When selected, a graphic leads to a different subset of the tour specifically tailored to the declared interest of the user. Alternatively, the user may select the graphic 75 to leave the tour. In this embodiment, the user selects Ivy League Universities Only 74.

In FIG. 10, this is shown as the user having selected Tour A. The ensuing portion of the flow chart has two branches. The branch on the left shows actions by the tour guide. The branch on the right shows pages displayed. The two are shown in a parallel fashion because the events in the left (tour guide) branch narrate and correspond to events in the right hand (page display) branch.

Following the user's selection of Ivy League Universities Only 74, a series of pages pertaining to this subject are displayed to the user with accompanying narration and queries by the guide 71.

As shown in FIG. 10, the tour next shows 106 and narrates 105 the itinerary for the tour. The narration in the this embodiment is comprised of audio information regarding the number of ivy league schools, their locations, the average tuition rate, and minimum entry requirements. The itinerary includes a list of the principal pages to be displayed during the tour.

Figure 8A:
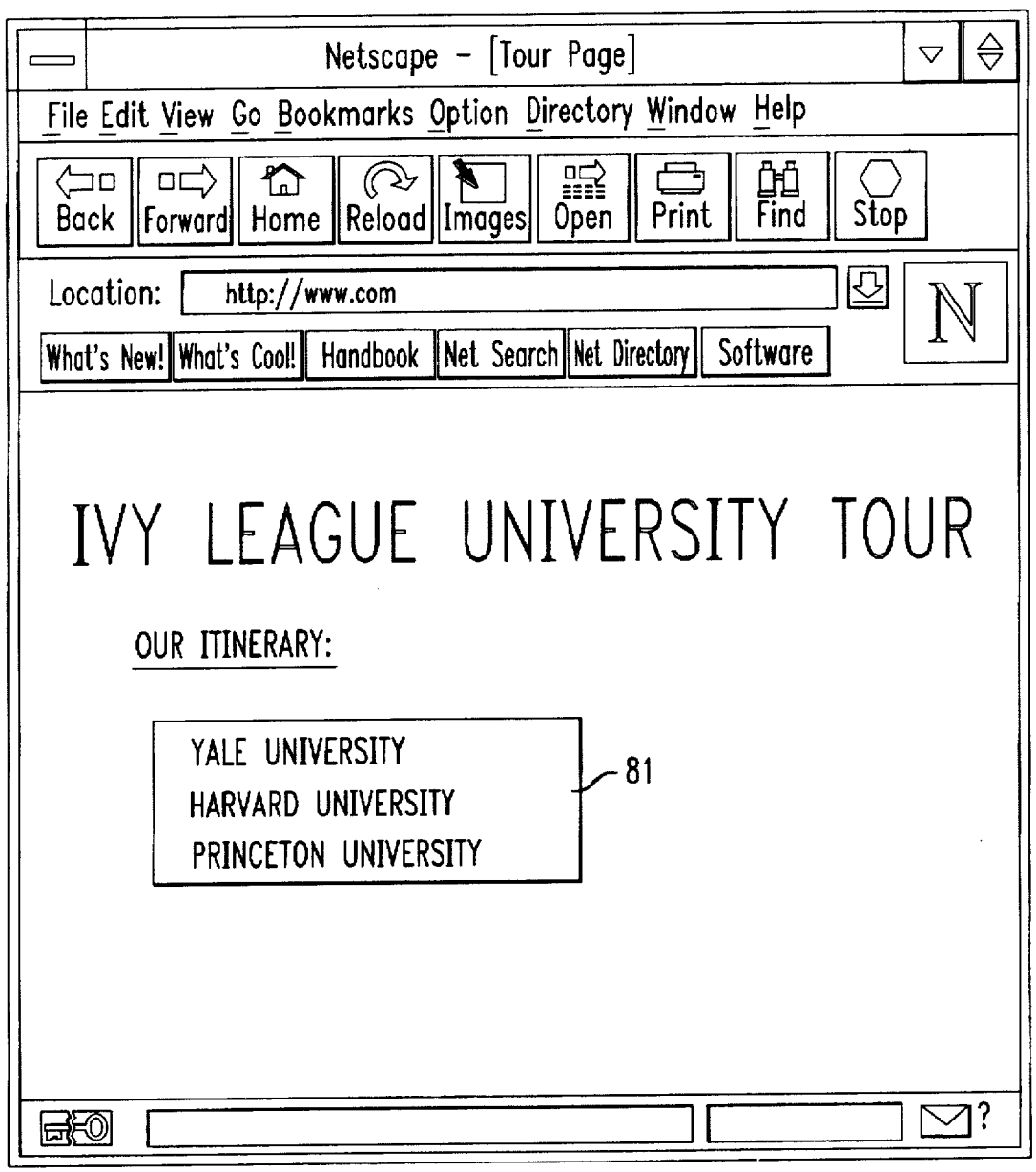
FIG. 8a shows an embodiment of another education tour page.

An embodiment of the itinerary page is shown in FIG. 8a. The itinerary 81 is presented as a textual list of school pages to be visited. In other embodiments, the list may be comprised of at least one of graphic, video or audio components.

After the itinerary page is narrated, the next page is displayed 108 (FIG. 10) and narrated 109. During the transition to this page, the guide provides transitionary remarks 107. In one embodiment, these remarks pertain to the content of the upcoming page. In the present embodiment, these remarks address the location, cost and entry requirements of Yale University. These remarks may also concern the tour in general, such as where in the tour the upcoming page appears (e.g., stating this is the second page in a four page tour). The narration 109 accompanying the new page further explains its contents.

Figure 8B:
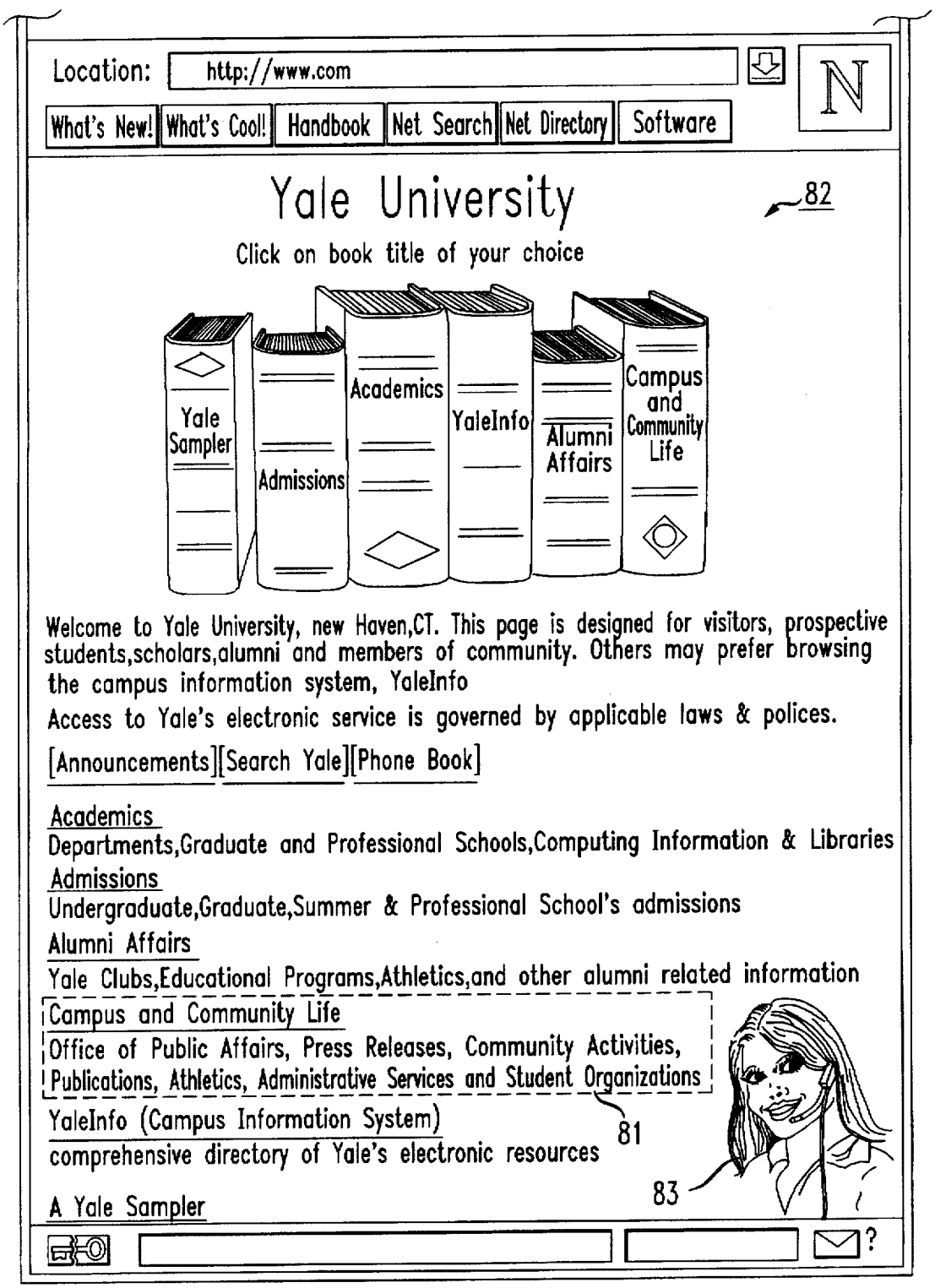
FIG. 8b shows an embodiment of yet another education tour page.

An embodiment of this page, called the second page 82 (the first page is considered to be that on which is listed the itinerary) is shown in FIG. 8b. The guide 83 appears and narrates the page in a way that complements and augments the content of the page 82. The guide 83 gives further background information about Yale University, including information about its environs, student body, and teaching staff. The guide 83 then indicates that the tour will proceed to examine some highlights of campus and community life at Yale 81, a link presented on the page 82.

The third page is then displayed 110 and narrated 111 (FIG. 10).

An embodiment of the third page 91 is shown in FIG. 9. This third page 91 may be loaded from the Yale University website host, or else loaded from the tour service provider host. The third page has links to a variety of topics, including, for example, administrative services 92 and dining at Yale 93.

After commenting 111 on the contents of the third page 91, the guide queries 112 the user if he wants to continue to learn more about Yale, continue to another university on the tour, or explore independently. The user responds by selecting one option 113. If the user indicates he wants to move on to the next university, the tour proceeds to display pages on another ivy league school 114 and narrate them 117. If the user indicates he wants to tour more of Yale, the tour proceeds to display additional Yale pages 115. Otherwise, the user may elect to explore independently 116.

The means for the user to select these options are shown in FIG. 9. Upon receiving the query from the guide 94, the user is presented with selectable graphics to choose to learn more about Yale 95, move on to the next university 96, or explore 97.

If the user indicates he wants to explore independently, the user may temporarily leave the tour and select links on his own and display pages independently of the tour 116 (FIG. 10). This may even involve leaving the Yale website.

Figure 11:
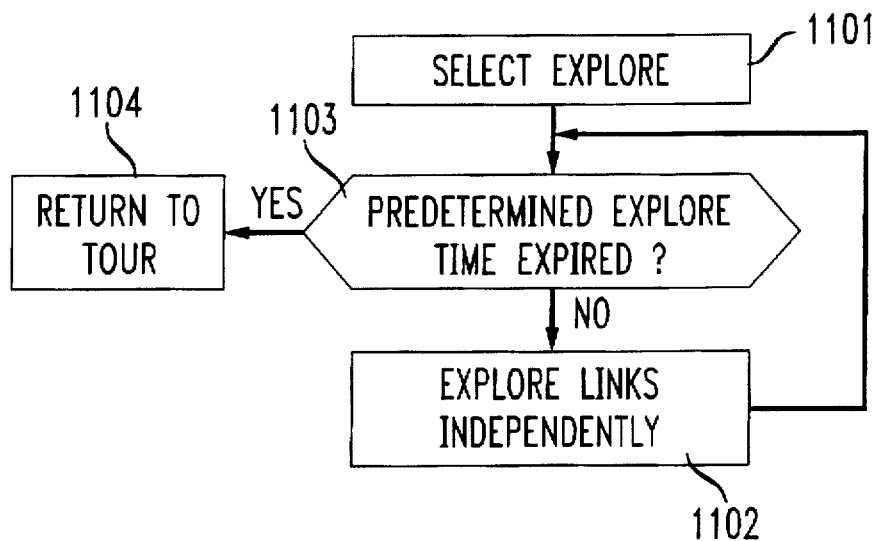
FIG. 11 shows a flow chart of an embodiment of the independent exploration feature of the present invention.

The explore feature is documented in FIG. 11. Upon selecting the option to explore 1101, the tour service allows the user to select links independently 1102 as long as a predetermined amount of time has not expired 1103. When the predetermined amount of time has expired, the tour guide will announce that it is time to resume the tour, and will display the next page on the tour to the user, thus resuming the tour 1104.

After touring more of Yale 115 (FIG. 10) or exploring 116, the tour is resumed by displaying a page on the next school 114. After the tour has run its course, a closing sequence of pages 1 18 that are narrated 119 ends the tour, and the user is returned to the browser. The browser may display the tour service page, so the user may select another tour.

The user selectable option to proceed vertically into greater depth into a single website on a tour, to proceed horizontally across websites on a tour, or to explore independently may be offered to the user at any time during a tour. Conversely, these options may not be offered to the user at all on a given tour.

In the event that a page scheduled to be shown at a certain place in a tour is unavailable, the tour may be dynamically reordered, and the presently unavailable page may be deferred until later in the tour, or else skipped entirely. The information provided by the tour guide is adapted to accommodate this contingency.

Figure 12:
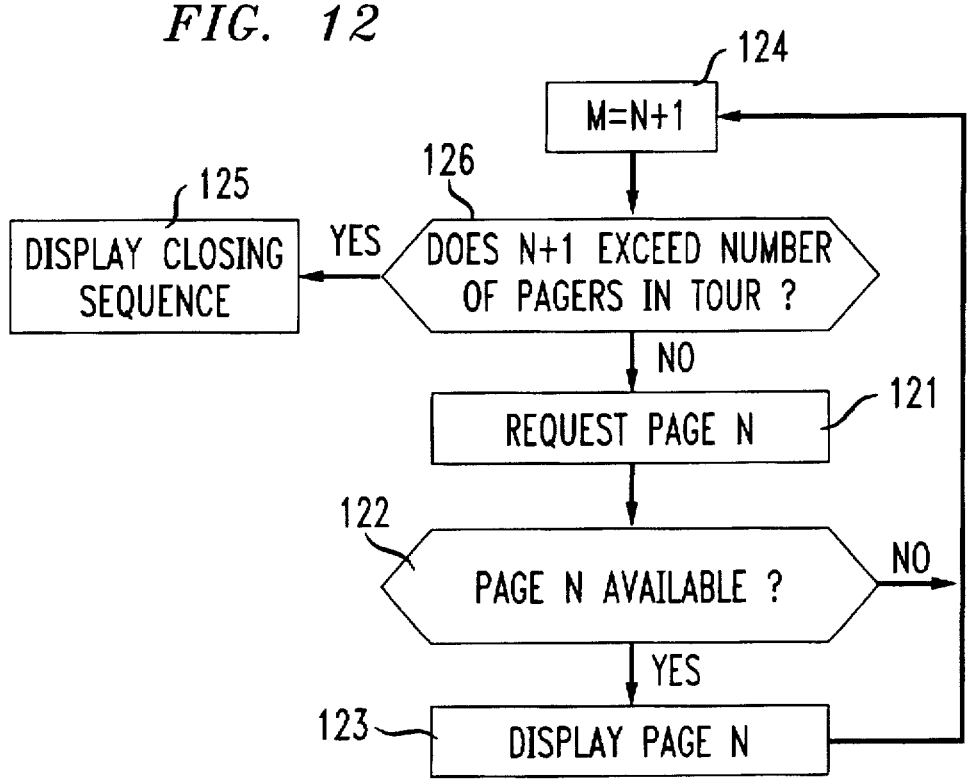
FIG. 12 shows a flow chart of an embodiment of the dynamic reordering function of the present invention.

An embodiment of this process of reordering is shown in FIG. 12. Unless the pages in the tour have been exhausted 126, after requesting page N 121, the tour service inquires whether the page is presently available for display 122. If the page is available, it is displayed 123, N is incremented 124, and the next page is requested 121. If the page is not presently available 122, N is incremented 124, and the next page is displayed 121. In this way, the unavailable page is skipped. If the number of pages has been exhausted, the tour displays the closing sequence 125.

In another embodiment, the tour service skips an unavailable page to a predetermined page that is not the next page. In yet another embodiment, the tour service stores a list of skipped pages and again requests and attempts to display them later during the tour.

In the event a page is taking a long time to display, the tour may provide predetermined padding material to keep the user entertained while the page is being loaded. This padding may take the form of audio remarks, video clips, graphics, textual material, animation, or any combination thereof.

Figure 13:
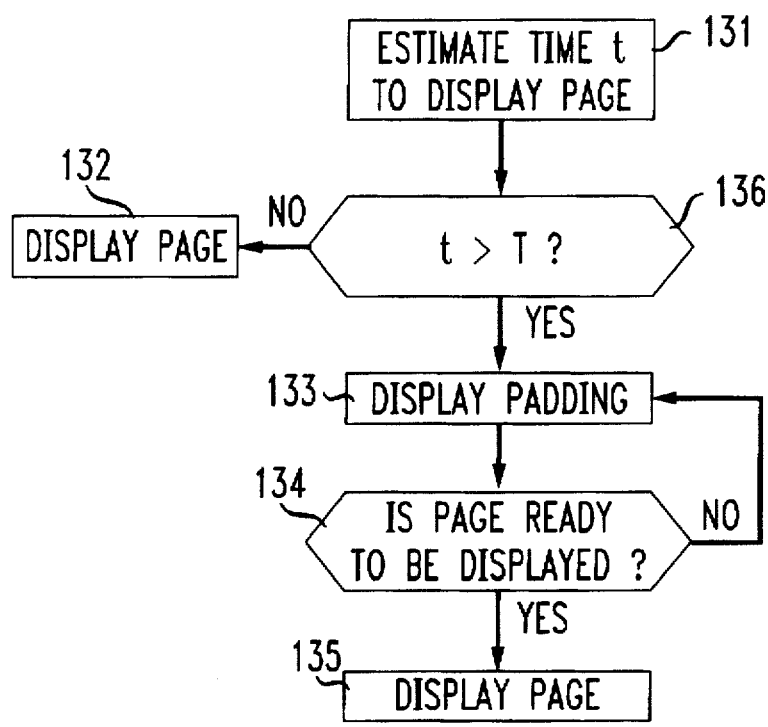
FIG. 13 shows a flow chart of an embodiment of the padding feature of the present invention.

An embodiment of this padding process for a single page is shown in FIG. 13. The tour service estimates the time t needed to display the page 131. If the time t does not exceed a predetermined time T 136, the page is displayed 132. If the time t does exceed a predetermined time T, padding is displayed 133. This padding may take the form of at least one of video, audio, graphic, textual or animated components generated from the guide, on a page, or both. The padding is stored in segments. After displaying a padding segment, the page is again checked to see if it is ready to be displayed 134. If it is not, another padding segment is displayed 133. If the page is ready to be displayed, it is displayed 135.

A user may take a "snapshot" of a page as it is displayed. This snapshot is stored along with the URL of the page in a tour album which the user can take with him after the end of the tour. The tour album is comprised of at least one file, and is generally stored on the user's computer.

Figure 14:
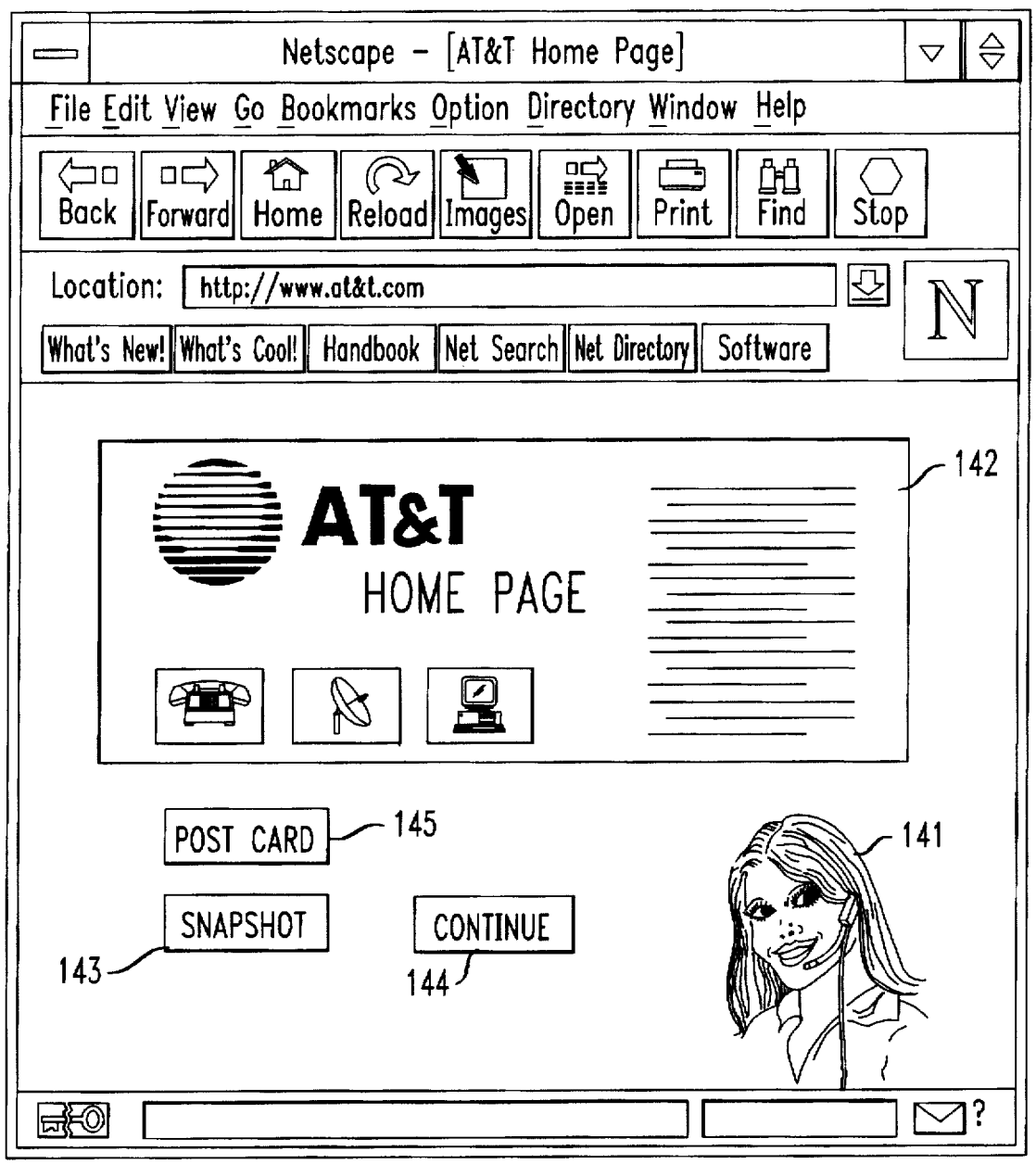
FIG. 14 shows an embodiment of a page having a snapshot selection feature.

An embodiment of the snapshot feature is shown in FIG. 14. The guide 141 asks the user if he wants to take a snapshot of the presently displayed page 142, and the user is presented with a selectable graphic 143, labeled "snapshot." Upon selecting the snapshot graphic 143, a picture of the page 142 and its URL is stored in the user's tour snapshot file. Upon selecting continue 144, the next page is displayed without storing a picture or the URL of the presently displayed page.

Figure 15:
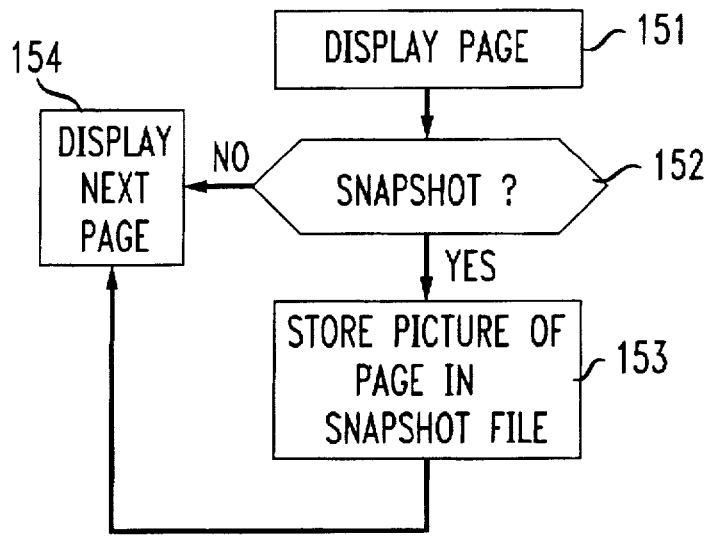
FIG. 15 shows a flow chart of an embodiment of the snapshot feature of the present invention.

This process of taking a snapshot of a single page is shown in FIG. 15. After displaying the page 151, the tour service accepts input from the user as to whether to store a picture and URL of the page in the snapshot file. If the user indicates he wants a snapshot, a picture and URL of the displayed page is stored 153 and the next page is displayed 154. If the user indicates he does not want a snapshot, the next page is displayed 154 without storing a picture or the URL of the presently displayed page.

Figure 15A:
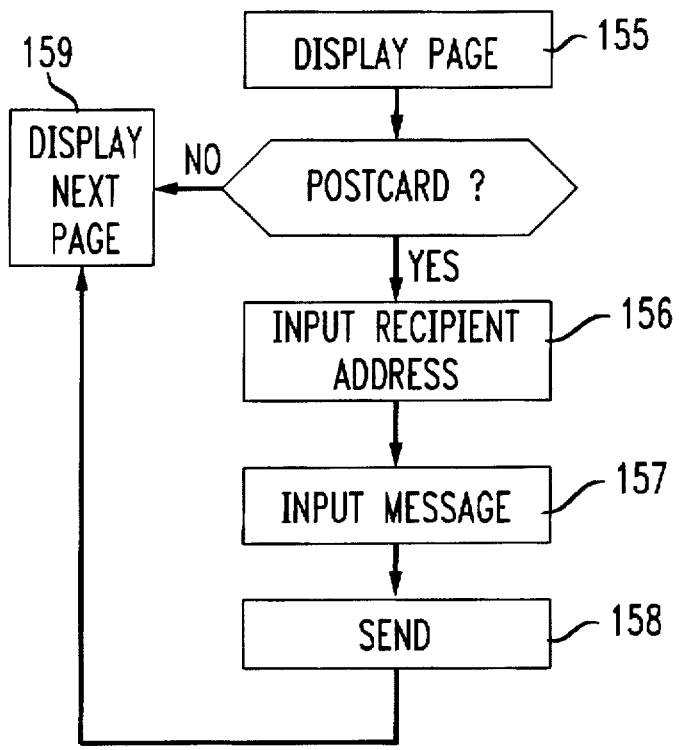
FIG. 15a shows a flow chart of an embodiment of the postcard feature of the present invention.

FIG. 15a shows and embodiment of the postcard feature of the present invention. In addition to the snapshot option shown in FIG. 15, the user has the option to send a graphic of the presently displayed page to another user as a postcard. A user is presented with a postcard graphic 145 (FIG. 14); 155 (FIG. 15a). If the user selects the postcard graphic, he is asked to enter the e-mail address of the intended recipient 156. Then he is prompted to enter a brief message 157 to accompany the postcard. When he is done entering the message, the user sends the message 158. A graphic of the page along with the message is then sent to the recipient, and the tour is resumed 159.

Figure 16:
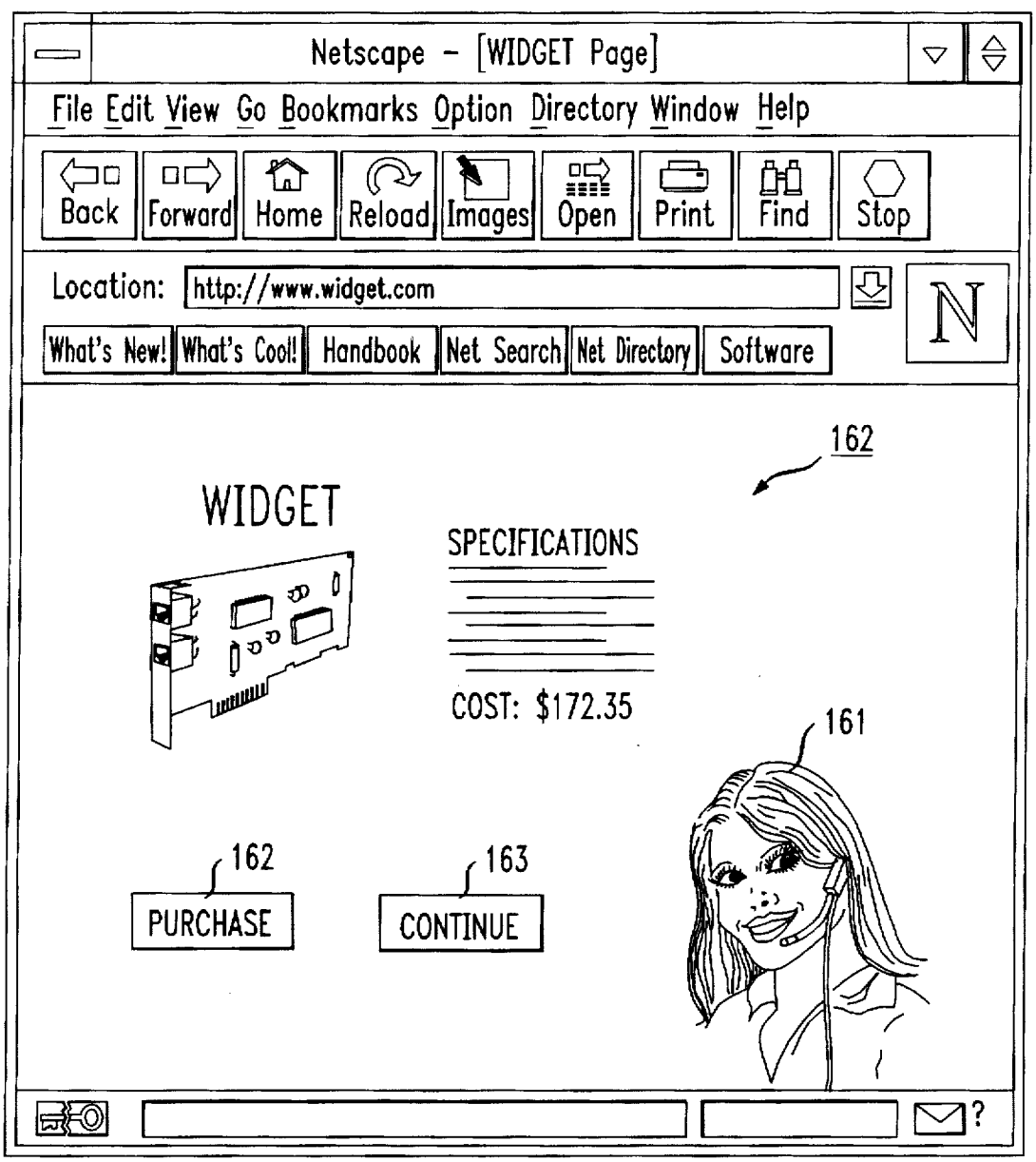
FIG. 16 shows an embodiment of a page with a purchase option feature.

During the tour, a user may be presented with an opportunity to make a purchase. An embodiment of a page 162 displaying a purchase opportunity is shown in FIG. 16. The guide 161 tells the user about the product, which is displayed on the page 162. The user is presented with selectable graphics by which to make 162 or decline 163 the purchase.

Figure 17:
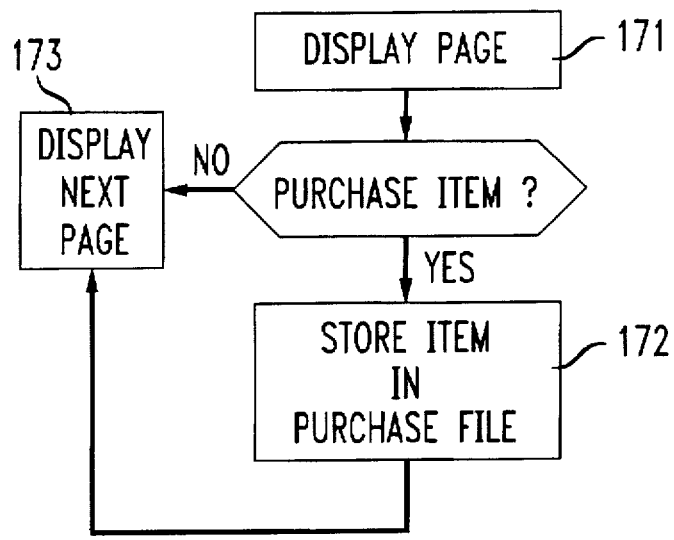
FIG. 17 shows a flow chart of an embodiment of the purchase option feature.

An embodiment of the purchase process is shown in FIG. 17. The item that may be purchased is displayed to the user on a page 171. If the user indicates he wants to make the purchase, a description of the item is stored in a purchase file 172, and the next page is displayed 173. If the user decides not to purchase the item, the next page on the tour is displayed 173 without storing the item in the purchase file.

Figure 18:
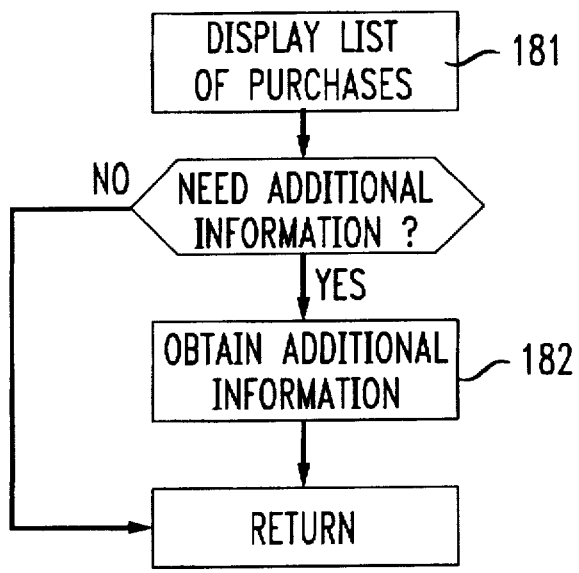
FIG. 18 shows a flow chart of an embodiment of the display purchases feature.

In this embodiment, the user is presented with a list of his purchases 181 at the end of the tour (FIG. 18). If additional information from the user is needed to complete the purchases, such as credit card numbers, shipping addresses, an electronic signature and the like, this information is obtained 182 from the user. If no further information is needed, the user is returned to the tour. The purchase list is often shown during the closing sequence 118 (FIG. 10) of the tour.

Figure 19:
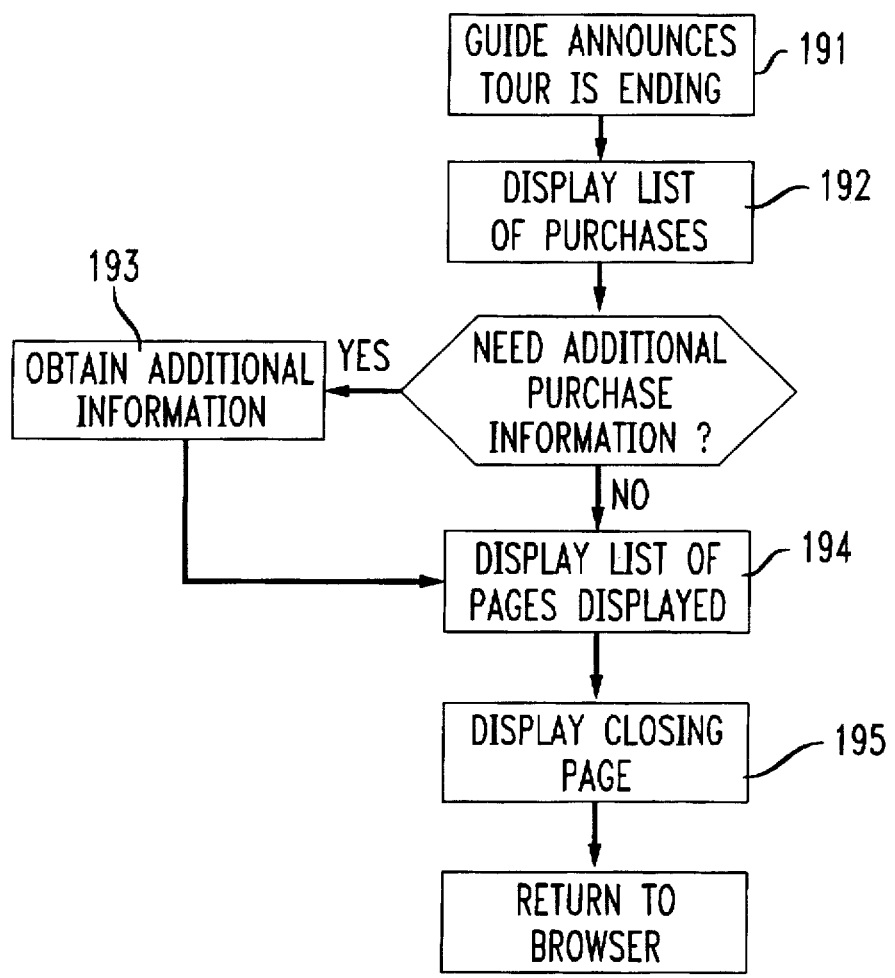
FIG. 19 shows a flow chart of an embodiment of a closing sequence ending a tour.

An embodiment of a closing sequence 118 is shown in FIG. 19. The closing sequence begins when the guide announces that the tour is coming to an end 191. The guide then presents a list of purchases made during the tour in accordance with the process shown in FIG. 18. If additional information is needed to complete the purchases, it is obtained from the user 193.

The user is next presented with a list of pages visited during the tour 194. This list includes all predetermined pages displayed to the user on the tour as well as any pages visited by the user during independent exploration. In one embodiment, this list is an ordered list, arranged in the chronological order in which the pages were visited from the top of the list to the bottom. Finally, a closing page is presented 195, and the user is returned to the browser. The browser may display the tour service page where the user may select another tour.

In yet another embodiment of the present invention, more than one user may join a tour in a multi-user tour. The users on a multi-user tour communicate with each other by means of at least one of voice, textual or video media.

Figure 20:
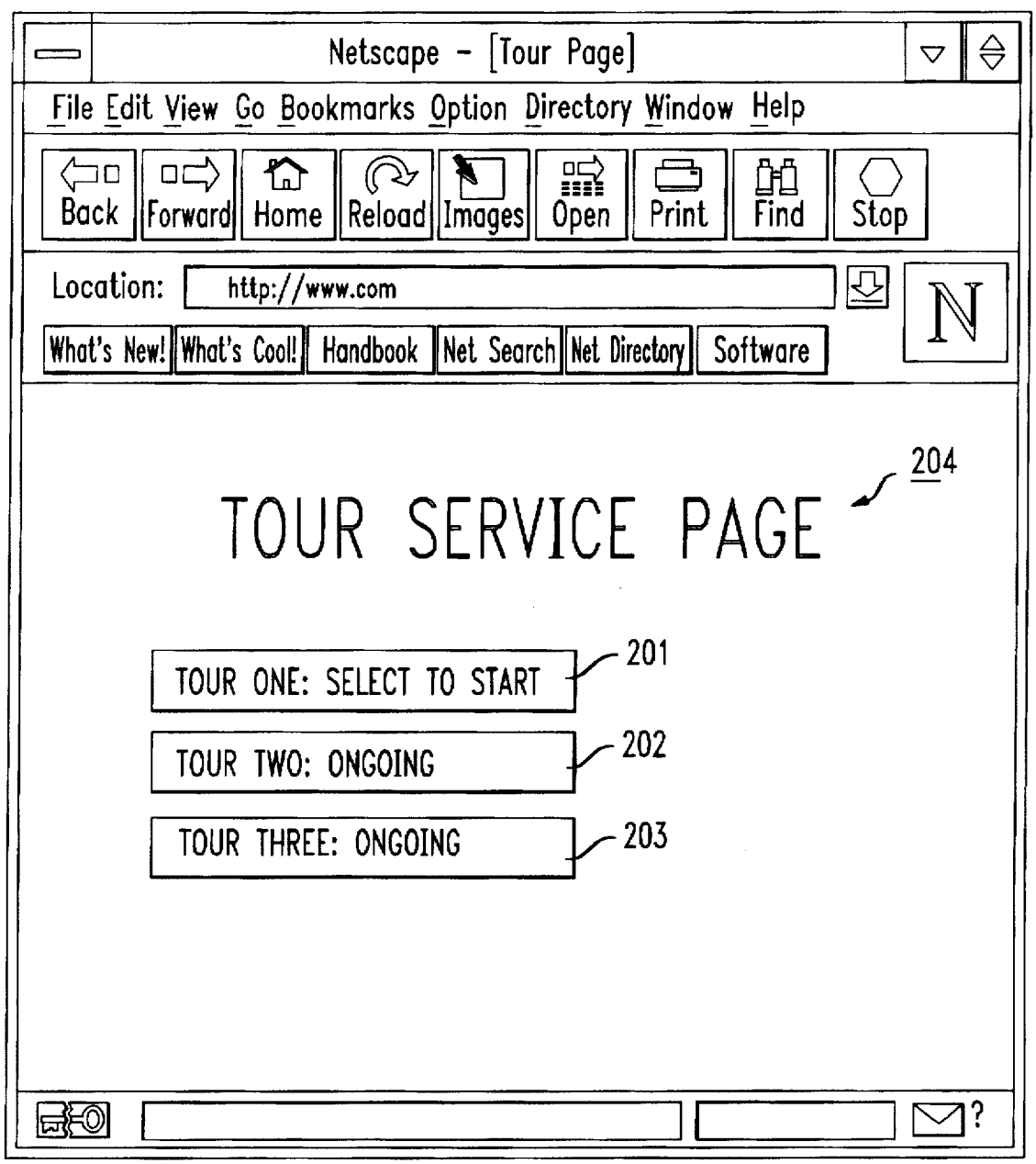
FIG. 20 shows an embodiment of tour service page displaying ongoing tours and a tour yet to start.

In an embodiment shown in FIG. 20, a user joins a tour by first displaying the tour service page 204. This tour service page lists a tour 201 that has yet to be initiated, and two tours 202 and 203 that are presently ongoing. When the user selects an ongoing tour, he joins the tour at the page presently displayed on the tour. Upon joining, the new user may communicate with other users on the tour.

In another embodiment of the present invention, a group of users may choose to participate in a tour from beginning to end together. In this embodiment, the initiating user selects a tour that is not ongoing 201.

Figure 21:
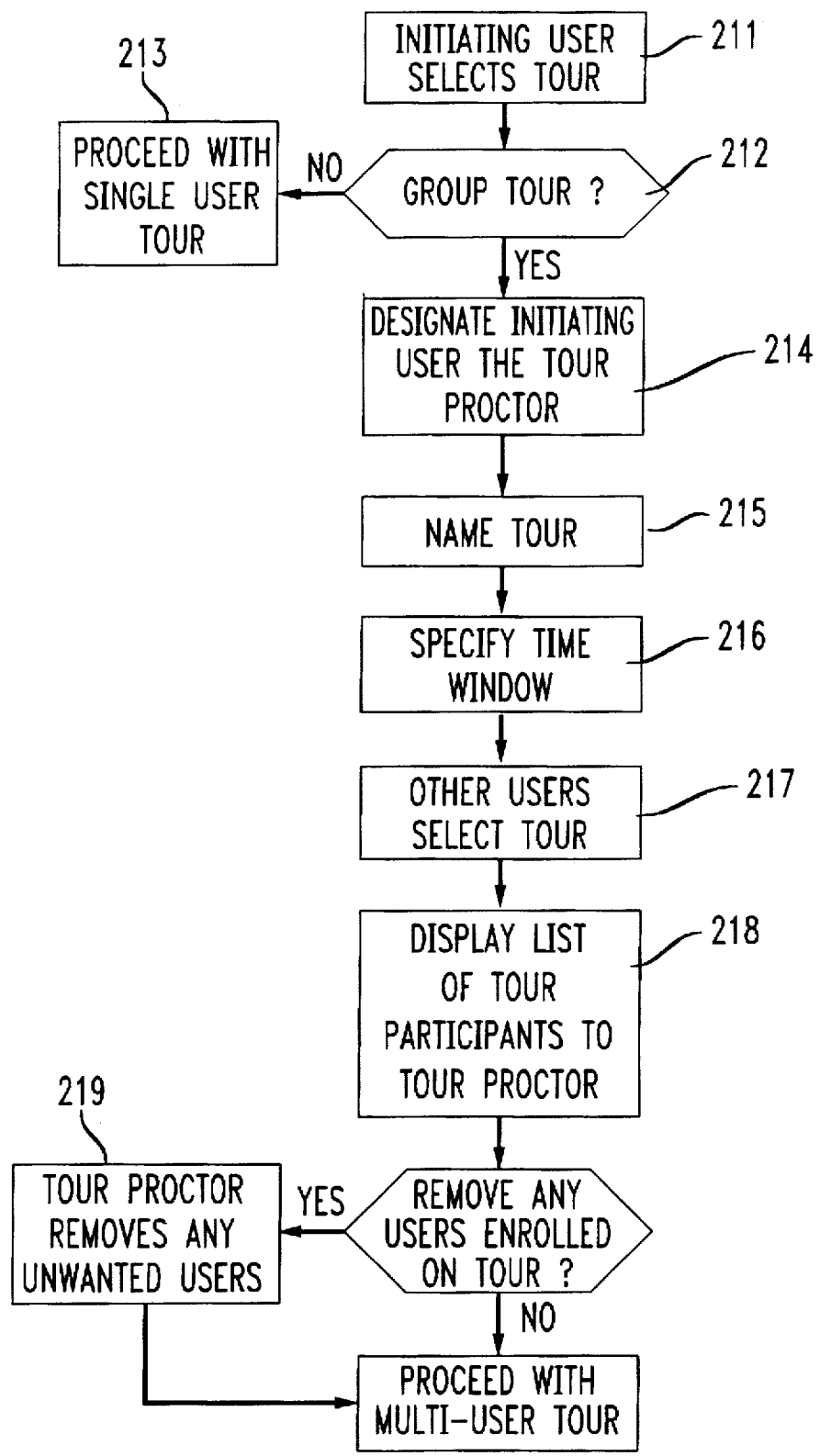
FIG. 21 shows a flow chart of an embodiment of the steps of establishing a multi user tour.

This step is shown as 211 in FIG. 21. The user is asked if he wants the tour to be a group tour 212. If the user does not want a group tour, the tour proceeds with the user as its sole participant 213. If the initiating user selects the group tour option, the initiating user is designated the tour proctor 214, named the tour 215, and specifies a window of time 216 during which others may join the tour.

Figure 22:
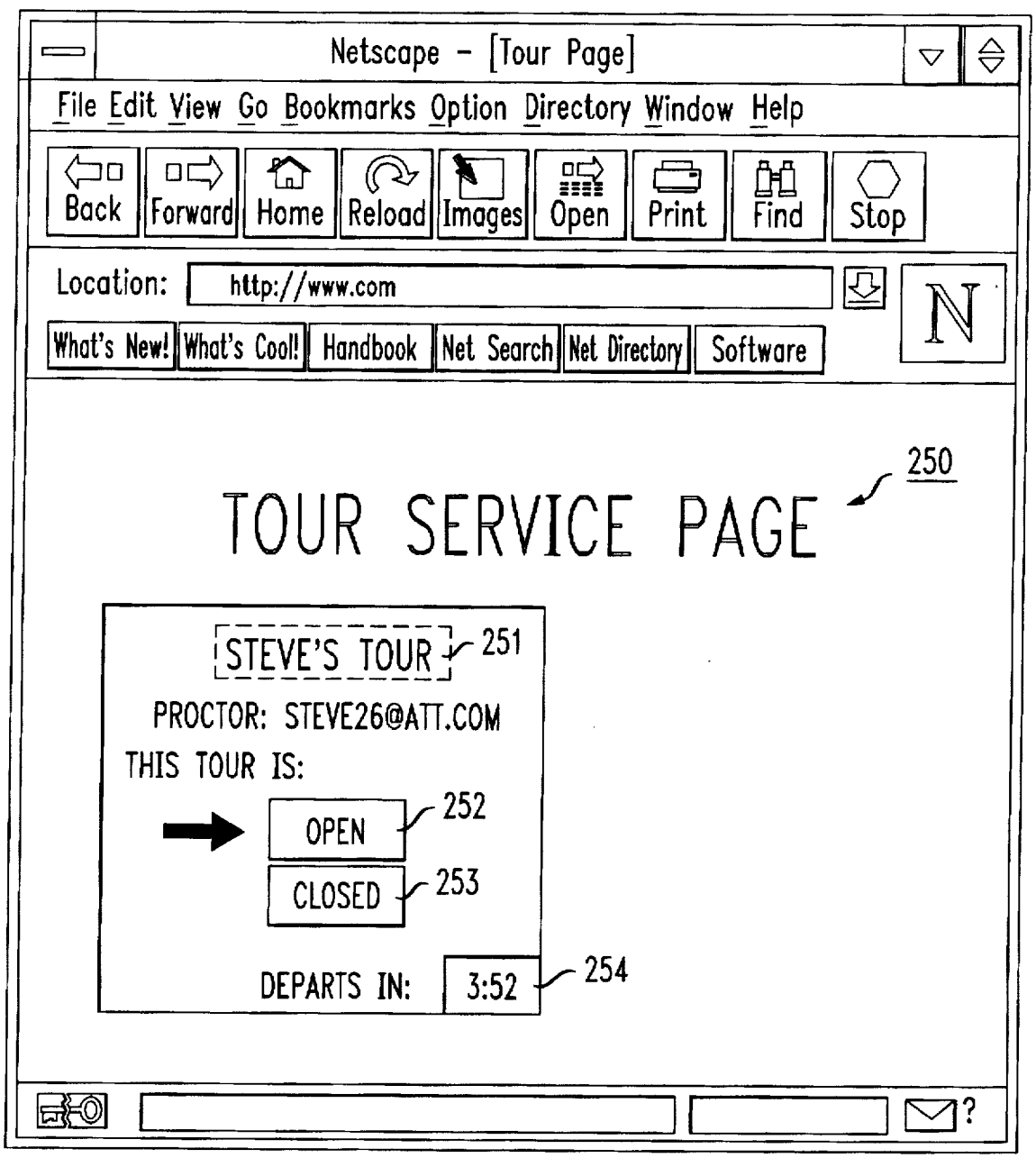
FIG. 22 is an embodiment of a tour service page showing a group tour.

A graphic representing the tour now appears on the tour service page 250 (FIG. 22) with the tour name 251, by means of which others may recognize the initiating user's tour by pre-arrangement. The graphic showing the tour indicates whether the tour is open 252 and anybody can join; or closed 253 and the tour proctor only wishes to proceed on the tour with members of a prearranged group. The graphic also contains a countdown timer 254. The countdown timer 254 displays how much time remains before the time to join the tour expires and the tour starts. Other users then select the group tour 217 (FIG. 21). As each additional user is added, the new users name is added to a tour participant list visible to the tour proctor 218. The tour proctor has the ability to remove users from the list 219.

Figure 23:
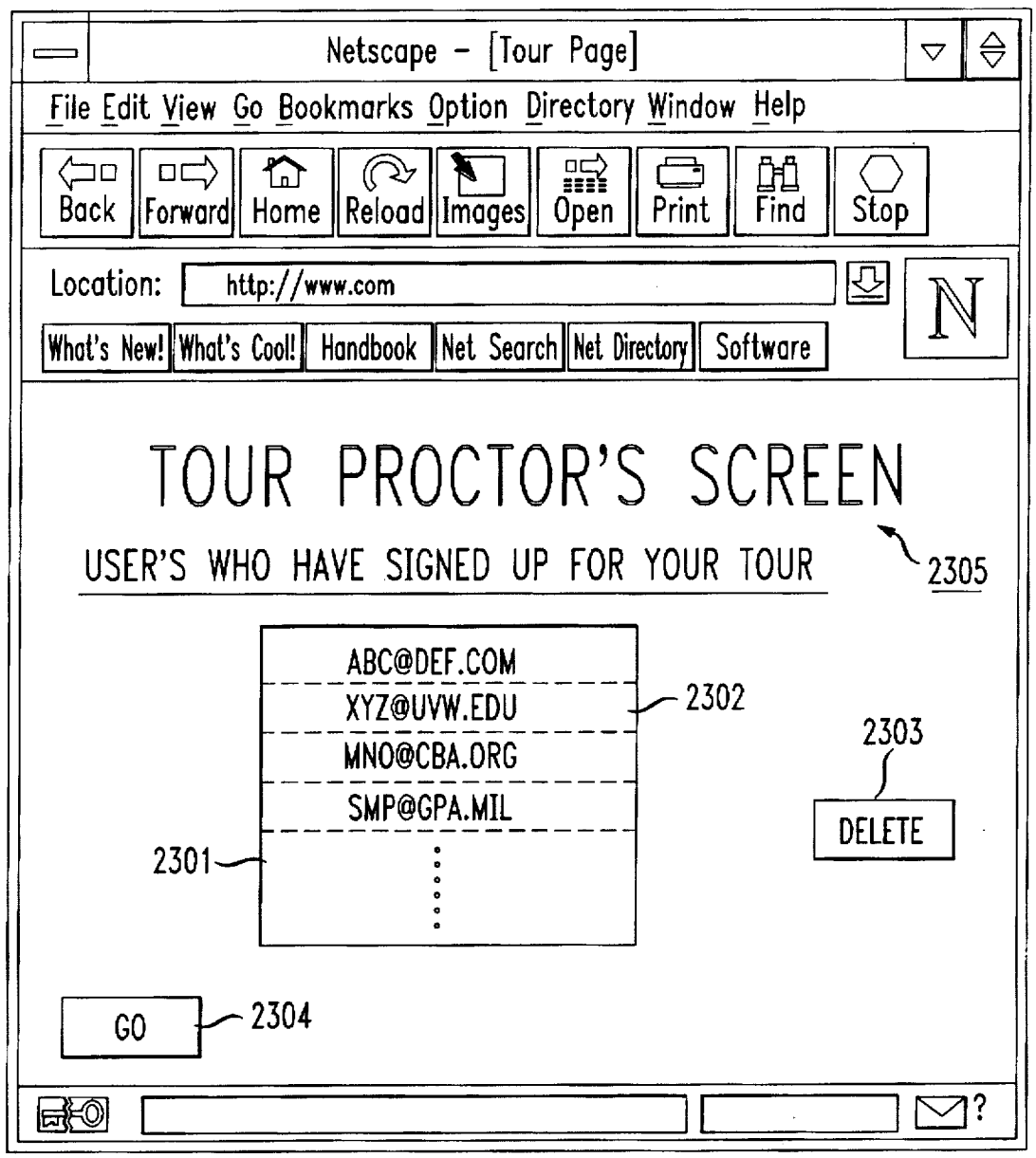
FIG. 23 is an embodiment of a proctor's screen displayed while establishing a group tour.

An embodiment of the page 2305 presenting the tour participant list 2301 is shown in FIG. 23. A user who has selected the tour may be removed by the tour proctor when the tour proctor selects the name of a participant 2302 on the list 2301 he wishes to remove, whereupon it is highlighted. The proctor then selects the delete graphic 2303 and the highlighted user is precluded from participating in the tour. In this way, participants on a tour may be limited, for example to a group of close friends, or members of a club.

Once the tour participants list is complete, the tour proctor initiates the tour by selecting the Go graphic 2304. In another embodiment, the tour is automatically initiated when the time window for other users to join expires. The tour then proceeds essentially as a single user tour would, except that the several participants on the tour communicate with each other.

In one embodiment, if one member of the tour is independently exploring and finds a page of exceptional interest he may communicate this fact and his location to his peers. This is carried out by speaking into a microphone on the user's computer. The tour participants are essentially participating in the equivalent of a voice conference call, and each can hear what each of the others is saying throughout the tour.

In another embodiment, each user's voice is attenuated according to his distance from each user to a predetermined page on the tour. This distance is calculated as the least number of links that must be selected in order to display a page being viewed by a user from the predetermined page presently displayed on the tour. In this embodiment, the voice of a user viewing a page five links away from the tour page will sound fainter to a tour participant viewing the tour page than the voice of a user viewing a page two links away. This conveys valuable information about how complicated it would be for one user to move to a different page being extolled by another user.

The single user or multi-user tour may be used to explore existing pages on websites across the Internet, explore the offerings of a corporate intranet, or provide instructional services based upon curricula embodied in Hypertext files resident on a single computer.

The tour service is provided by means of tour service software, which is comprised of instructions and data relating to the order, presentation, and content of the tour. The tour service software resides on a single stand-alone computer, at least one intranetworked computer, or at least one internetworked computer.

If the tour service software resides on a single stand-alone computer, users who participate in a tour must do so through the same computer on which the tour service page resides. That is, in this embodiment, users must use input/output devices directly connected to the stand-alone computer to participate in a tour.

Examples of such input/output devices include a display screen, a keyboard, a mouse, a microphone, and a joystick.

Tour service software may also be distributed on one or more intranetworked computers (i.e., a computer networked with other computers using a local or wide area network) or internetworked computers (i.e., a computer networked with other computers on other networks). In this event, tour service software occurs in two forms: primary and secondary. Primary tour service software comprises at least one tour service page; instructions and data on the overall organization and structure of the tour; and inductions and data that relate to the automated guide. Secondary tour service software mostly comprises data and subroutines that are needed to carry out the tour determined by the tour service software.

A primary tour server is a computer having hypertext transport protocol (HTTP) server software and on which primary tour software resides. HTTP server software enables the primary server to exchange data with other computers that present data and accept user input through Hypext pages. A computer on which secondary tour software resides is called a secondary tour server. There is generally one primary tour server, where as there may be from none to many secondary tour servers.

Figure 24:
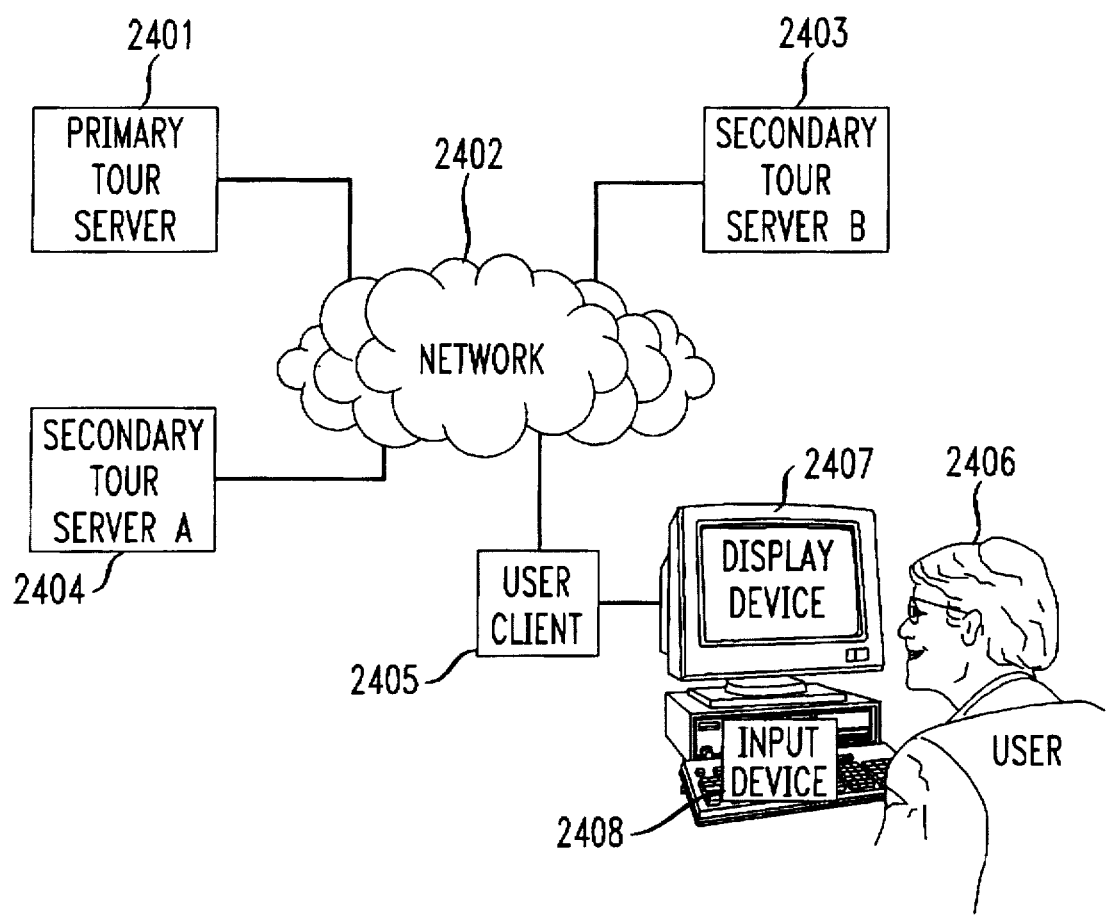
FIG. 24 shows tours servers communicating to a user client on a network.

An embodiment of such a distributed, networked tour service is shown in FIG. 24. Primary tour service software resides on primary tour server 2401, which is commected through a network 2402 with secondary tour server A 2403, secondary tour server B 2404, and a user's computer 2405, known as a user client. The network 2302 may be an inunetwork, such as a local or wide area network, or an internetwork, such as the Internt. The user 2406 participates in the tour through input/output devices directly connected to the user client. In this embodiment, such devices include a display screen 2407 and a mouse 2408.In FIG. 24, the user (through the user client) rquest the mary tour server to provide a tour service page, such as that shown as 41 in FIG. 4. This request is sent to the primary tour server through the network in a manner that is known in the art. The primary tour server 2401, shown in FIG. 24, responds by transmitting tour service page Hypertext data through the network 2402 to the user client. The tour service page Hypertext data is displayed to the user by the browser through a display screen 2407.

The user proceeds to select a tour in accordance with steps 101 through 106, inclusive, as shown in FIG 10. These steps implicate only the user client and the primary tour server. However, the contents of page two, shown as 82 in FIG. 8b, reside on secondary server A 2403. The network address or URL of secondary server A is transmitted from the primary server to the client, along with the information that page two of the tour resides on secondary server A. Step 108 (FIG. 10) is carried out in accordance with the present invention by the client transmitting a request for page two to secondary server A, which then sends page two 82 (FIG. 8b) to the user client 2403. Likewise, to carry out step 110 shown in FIG. 10, a request for page three 91 (FIG. 9) Hypertext data is sent from the user client to secondary tour server B 2404, using the secondary server B address as the location of tour page three that was previously sent to the user client from the primary server.

In this embodiment, the primary tour server 2401 is a computer on a local area network of computers located at educational institutions in New Haven, Connecticut, which is the location of Yale University. The user client 2403 is a computer in a New Haven high school guidance counseling office, and the user 2406 is a graduating senior in the process of selecting a college to attend. Secondary server A 2403 is a computer in the Yale University Office of Admissions, and has general information about Yale, including the Hypertext file that comprises page two, shown as 82 in FIG. 8b. Likewise, secondary server B 2404 is another computer in the Yale University Office of Student Life, which has specific information about campus and community life, including the Hypertext file that comprises page three, shown as 91 in FIG. 9.

At the end of the tour, the closing sequence is composed and transmitted to the user client exclusively by the primary tour server 2401. The primary tour server 2401 also prompts and accepts input from the user 2406 by querying the user 2406 and displaying possible responses in the form of selectable graphics on the user's display screen 2407. The user 2406 provides input by selecting a graphic that corresponds best to his response using his mouse 2408.

The invention claimed is:

1. A system for providing a structured tour of hypertext files, comprising:
    a. a server having a tour service page, a plurality of predetermined tour pages, and automated tour guide software that generates automated tour guide information, said server controlling the presentation of said tour pages and synchronizing said automated tour guide information with the presentation of said tour pages;
    b. a plurality of clients that display said tour service page, said tour pages, and said automated tour guide information; and
    c. a network connecting said clients to each other and said server to said clients, wherein said server transmits said tour service page, said tour page, and said automated tour guide information through said network to said clients.

2. The system of claim 1, wherein said data is transmitted between said clients through said network, said data comprising at least one form of information selected from the group of audio, text, graphic, video and animation.

3. The system of claim 1, wherein data entered by a user is transmitted from at least one of said plurality of clients to said server.

4. The system of claim 1, wherein said tour service page comprises a tour representation, said tour representation comprising at least one form of information selected from the group of audio, text, graphic, video and animation.

5. The system of claim 4, wherein said tour representation indicates whether a tour is open or closed.

6. The system of claim 4, wherein said tour representation indicates the length of time remaining for a user to select the tour corresponding to said tour representation.

7. The system of claim 4, wherein said tour representation indicates a tour name selected by a user.

8. The system of claim 1, wherein at least one of said tour pages comprises a link that, when selected by a user, causes a linked page to be displayed on said client.

9. The system of claim 1, wherein at least one of said clients transmits data entered by a user to said server through said network.

10. A method of providing a structured group tour of Hypertext files, 2 comprising the steps of:
    a. displaying a tour service page to a first user, said tour service page comprising a tour representation;

b. displaying a group tour option when said tour representation is selected by the first user;

c. designating the tour a group tour when said group tour option is selected by the first user;

d. querying the first user to name said group tour;

e. displaying a group tour representation on said tour service page, said group tour representation comprising a group tour name entered by the first user;

f. querying the first user to designate a window of time during which other users may join said group tour;

g. displaying said group tour representation on said tour service page, said group tour representation further comprising the time remaining for other users to join said group tour;

h. displaying said tour service page comprising said group tour representation to other users; and i. displaying a predetermined plurality of tour pages and automated tour guide information to the first user and other users who selected said group tour representation before the expiration of said window of time.

11. The method of claim 10, wherein said window of time is determined by beginning time and an ending time entered by the first user.

12. The method of claim 10, wherein said window of time is determined by a beginning time and a duration entered by the first user.

13. The method of claim 10, wherein said window of time is determined by an ending time and a duration entered by the first user.

14. The method of claim 10, wherein a list of other users who have selected said tour representation corresponding to said group tour is displayed to the first user until the expiration of said window of time.

15. The method of claim 10, wherein a list of all users who have selected said tour representation corresponding to said group tour is displayed to all users until the expiration of said window of time.

16. The method of claim 10, wherein said group tour is deselected by a deselecting user before the expiration of said window of time, whereupon said tour pages and guide information comprising the tour is not displayed to said deselecting user.

17. The method of claim 10 further comprising the steps of:

a. displaying a linked page when a link is selected on a presently displayed tour page by a user, and b. resuming said tour after a predetermined period of time after said linked page is displayed by displaying a predetermined tour page and accompanying automated tour guide information to the user at the expiration of said period of time.

18. The method of claim 10, further comprising the steps of:

a. displaying a tour page having a snapshot option to the user; and b. storing a graphic and the URL of said tour page in a snapshot album 4 file when said snapshot option is selected by the user.

19. The method of claim 10, further comprising the step of displaying an itinerary of said tour to the user around the beginning of said tour, said itinerary comprising a list of tour pages that comprise said tour.

20. The method of claim 10, further comprising the step of displaying a history of said tour to said user around the end of said tour, said history comprising a list of pages displayed to the user during said tour.

21. The method of claim 10, wherein said tour comprises a subset of predetermined tour pages and automated tour information, said subset determined by selections made by a user during said tour, comprising the steps of:

a. displaying a tour page regarding a first topic to a user;

b. querying the user as to whether the user desires further tour pages to be displayed regarding said first topic;

c. displaying further tour pages regarding said first topic when the user indicates a desire to see further tour pages regarding said first topic; and d. displaying a tour page regarding a second topic when the user indicates a desire not to see further pages regarding said first topic.

22. The method of claim 10, further comprising the step of displaying a second tour page to the user when a first tour page is unavailable for display.

23. The method of claim 10, further comprising the steps of:

a. displaying a tour page to a user, said tour page showing an item that may be purchased by the user, b. requesting purchase information from the user when the user indicates a desire to purchase said item; and c. accepting and storing said purchase information from the user.

24. A method or providing a structured group tour of Hypertext files, comprising the steps of:

a. displaying a tour service page to a first user, said tour service page comprising a tour representation;

b. displaying a group tour option when said tour representation is selected by the first user;

c. designating the tour a group tour when said group tour option is selected by the first user;

d. querying the first user to name said group tour;

e. displaying a group tour representation on said tour service page, said group tour representation comprising a group tour name entered by the first user;

f. querying the first user to designate said group tour either open or closed:

g. querying the first user to designate a window of time during which other users may join said group tour;

h. displaying said group tour representation on said tour service page, said group tour representation further comprising the time remaining for other users to join said group tour,;

i. displaying said tour service page comprising said group tour representation to other users;

j. displaying a list of other users who have selected said group tour to said first user until the expiration of said window of time;

k. removing a user from said group tour when said user is selected to be removed from said list by the first user; and l. displaying a predetermined plurality of pages and automated tour guide information to the first user and other users who selected said group tour representation before the expiration of said window of time and who were not selected to be removed by the first user.

25. A system for providing a structured tour of Hypertext files, comprising:

a. means for displaying a list of at least one tour;

b. means for conducting a tour, comprising:

i. means for displaying a predetermined series of pages; and ii. means for providing narration to accompany the display of said predetermined series of pages.

26. A system for providing a structured tour of Hypertext files, comprising:
   a. a primary tour server with hypertext transport protocol software;
   b. a user client having at least one display device connected to said primary tour server through a network;
   c. primary tour server software residing on said primary tour server, said primary tour server software comprising:
      i. at least one tour service hypertext file;
      ii. instructions and data for causing a predetermined series of pages to presented on said display device of said user client; and
      iii. instructions and data for causing an automated tour guide to provide narrative accompanying the presentation of said predetermined series of pages on said display device of said user client; and
   d. a browser residing on said user client, said browser presenting said predetermined series of pages on said display device of said user client.

27. The system of claim 26, wherein said display device is a display screen.

28. The system of claim 26, wherein said display device is an audio speaker.

29. The system of claim 26, further comprising an input device through which the user provides input to said user client during a tour.

30. A system for providing a structured tour of hypertext files, comprising:
   a. a primary tour server with hypertext transport protocol software;
   b. a user client connected to said primary tour server through a network, said user client comprising:
      at least one display device;
      ii. at least one input device; and
   c. primary tour server software residing on said primary tour server, said primary tour server software comprising:
      i. at least one tour service hypertext file;
      ii. instructions and data for causing a predetermined series of pages to presented on said display device of said user client; and
      iii. instructions and data for causing an automated tour guide to provide narrative accompanying the presentation of said predetermined series of pages on said display device of said user client; and
   d. a browser residing on said user client, said browser presenting said predetermined series of pages on said display device of said user client.

31. The system of claim 30, wherein said input device is a mouse.

32. The system of claim 30, wherein said input device is a keyboard.

33. The system of claim 30, wherein said input device is a microphone.

34. The system of claim 30, wherein said input device is a camera.

35. The system of claim 30, wherein said network is a local area network.

36. The system of claim 30, wherein said network is a wide area network.

37. The system of claim 30, wherein said network is a connectionless packetitched network.

38. A method of allowing a second user to join an ongoing structured tour of hypertext files previously initiated by a first user, comprising the steps of:
   a. displaying a tour service page to a second user, said tour service page comprising a tour representation of a tour previously initiated by said first user, said tour representation indicating that said tour is presently ongoing;
   b. displaying to the second user the page with automated tour guide information presently displayed to the first user when said ongoing tour representation is selected by said second user; and
   c. displaying a predetermined plurality of pages and automated tour guide information in series to the first user and the second user.

39. The method of claim 30, further comprising the steps of:
   a. displaying a tour page having a postcard option to the user;
   b. accepting a recipient address from the user;
   c. accepting a message from the user; and
   d. sending said message and a graphic of said tour page to said recipient address at the request of the user.

* * * * *

UNITED STATES PATENT AND TRADEMARK OFFICE
CERTIFICATE OF CORRECTION

PATENT NO. : 5,760,771
DATED : June 2, 1998
INVENTOR(S) : Greg E. Blonder, Summit, New Jersey; Allen E. Milewski, Red Bank, New Jersey It is certified that error appears in the above-identified patent and that said Letters Patent is hereby corrected as shown below:

On the title page, item [73]:

Assignee: AT&T Corp. Middletown, N. J.

Signed and Sealed this

Thirteenth Day of July, 1999

Attest:

Q. TODD DICKINSON

*Attesting Officer*  *Acting Commissioner of Patents and Trademarks*